US007973858B2

(12) United States Patent
Pai et al.

(10) Patent No.: US 7,973,858 B2
(45) Date of Patent: Jul. 5, 2011

(54) REDUCED MEMORY AND BANDWIDTH MOTION ADAPTIVE VIDEO DEINTERLACING

(75) Inventors: Cheng-Yu Pai, Kitchener (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1290 days.

(21) Appl. No.: 11/585,345

(22) Filed: Oct. 23, 2006

(65) Prior Publication Data

US 2008/0094505 A1 Apr. 24, 2008

(51) Int. Cl.
*H04N 7/01* (2006.01)
*H04N 11/20* (2006.01)

(52) U.S. Cl. ......................... 348/452; 348/451; 348/448

(58) Field of Classification Search .................. 348/448, 348/451, 452, 458, 459; *H04N 7/01, 11/20*
See application file for complete search history.

(56) References Cited

U.S. PATENT DOCUMENTS

| | | | | |
|---|---|---|---|---|
| 7,075,580 | B2 | 7/2006 | Jiang | 348/448 |
| 7,405,766 | B1 * | 7/2008 | Chou et al. | 348/448 |
| 2004/0189866 | A1 * | 9/2004 | Lin et al. | 348/452 |
| 2005/0122426 | A1 | 6/2005 | Winger et al. | 348/452 |

OTHER PUBLICATIONS

U.S. Appl. No. 10/727,476, filed Dec. 4, 2003.

* cited by examiner

*Primary Examiner* — Sherrie Hsia
(74) *Attorney, Agent, or Firm* — Christopher P. Maiorana, PC

(57) ABSTRACT

A method for reduced memory and bandwidth motion adaptive video deinterlacing is disclosed. The method generally includes the steps of (A) generating a frame by deinterlacing a current field in a first of a plurality of modes, (B) generating the frame by deinterlacing using both of the current field and an opposite-parity field in a second of the modes and (C) generating the frame be deinterlacing using all of the current field, the opposite-parity field and another field in a third of the modes, wherein the method uses at least two of the modes.

20 Claims, 25 Drawing Sheets

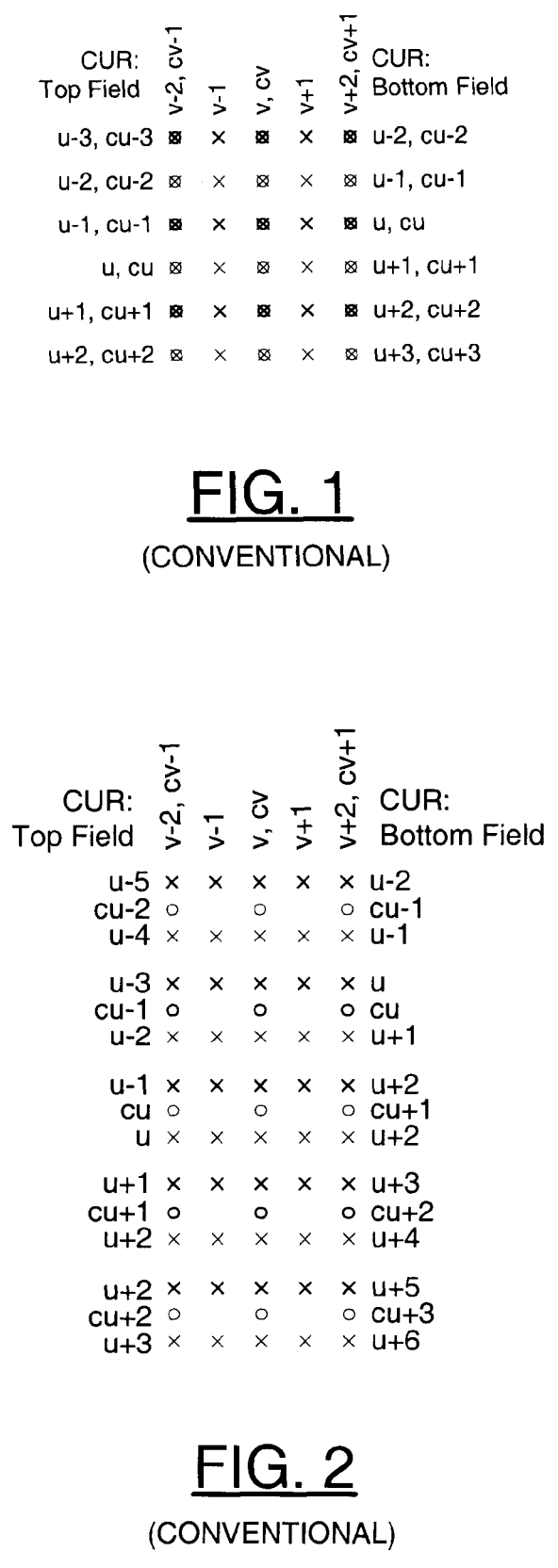

| CUR: Top Field | v-2, cv-1 | v-1 | v, cv | v+1 | v+2, cv+1 | CUR: Bottom Field |
|---|---|---|---|---|---|---|
| u-3, cu-3 | ⊠ | × | ⊠ | × | ⊠ | u-2, cu-2 |
| u-2, cu-2 | ⊠ | × | ⊠ | × | ⊠ | u-1, cu-1 |
| u-1, cu-1 | ⊠ | × | ⊠ | × | ⊠ | u, cu |
| u, cu | ⊠ | × | ⊠ | × | ⊠ | u+1, cu+1 |
| u+1, cu+1 | ⊠ | × | ⊠ | × | ⊠ | u+2, cu+2 |
| u+2, cu+2 | ⊠ | × | ⊠ | × | ⊠ | u+3, cu+3 |

FIG. 1
(CONVENTIONAL)

| CUR: Top Field | v-2, cv-1 | v-1 | v, cv | v+1 | v+2, cv+1 | CUR: Bottom Field |
|---|---|---|---|---|---|---|
| u-5 | × | × | × | × | × | u-2 |
| cu-2 | ○ | | ○ | | ○ | cu-1 |
| u-4 | × | × | × | × | × | u-1 |
| u-3 | × | × | × | × | × | u |
| cu-1 | ○ | | ○ | | ○ | cu |
| u-2 | × | × | × | × | × | u+1 |
| u-1 | × | × | × | × | × | u+2 |
| cu | ○ | | ○ | | ○ | cu+1 |
| u | × | × | × | × | × | u+2 |
| u+1 | × | × | × | × | × | u+3 |
| cu+1 | ○ | | ○ | | ○ | cu+2 |
| u+2 | × | × | × | × | × | u+4 |
| u+2 | × | × | × | × | × | u+5 |
| cu+2 | ○ | | ○ | | ○ | cu+3 |
| u+3 | × | × | × | × | × | u+6 |

FIG. 2
(CONVENTIONAL)

TABLE 1

| Mode | Note | Control Bits | | | | | | | RAM Read Bandwidth* (fields) | | | | Lines Accessed* (Y/CbCr/HSCnt) | | | | Mode Description | | |
|---|---|---|---|---|---|---|---|---|---|---|---|---|---|---|---|---|---|---|---|
| | | T | A | C2 | C3 | S | W | B | Y | Cb/Cr | HSCnt | Total | *PRE* | *CUR* | *NXT* | Total | Luma | Chroma | Comment |
| 1 | | 0 | 0 | 0 | 0 | 0 | 0 | 1 | 1 | 1 | 0 | 1½ | 0/0/0 | 2/2/0 | 0/0/0 | 4 | BB | BB | Bob |
| 2 | ✪✓ | 0 | 1 | 0 | 0 | 0 | 0 | 1 | 1 | 1 | 0 | 1½ | 0/0/0 | 4/2/0 | 0/0/0 | 6 | BB, DI | BB, DI | Bob$^{+}$ |
| 3 | | 0 | 0 | 0 | 0 | 0 | 1 | 0 | 2 | 1 | 0 | 2½ | 1/0/0 | 1/2/0 | 0/0/0 | 4 | WV | BB | Weave$^{-}$ |
| 4 | | 0 | 0 | 0 | 0 | 0 | 0 | 0 | 2 | 1 | 0 | 2½ | 1/0/0 | 4/2/0 | 0/0/0 | 7 | B2 | BB | MADI |
| 5 | ✪✓ | 0 | 1 | 0 | 0 | 0 | 0 | 0 | 2 | 1 | 0 | 2½ | 1/0/0 | 4/2/0 | 0/0/0 | 7 | B2, DI | BB, DI | ReMADI |
| 6 | | 0 | 0 | 1 | 0 | 0 | 1 | 0 | 2 | 2 | 0 | 3 | 1/1/0 | 1/1/0 | 0/0/0 | 4 | WV | WV | Weave |
| 7 | | 0 | 0 | 1 | 0 | 0 | 0 | 0 | 2 | 2 | 0 | 3 | 1/1/0 | 4/2/0 | 0/0/0 | 8 | B2 | B2 | |
| 8 | ✓ | 0 | 1 | 1 | 0 | 0 | 0 | 0 | 2 | 2 | 0 | 3 | 1/1/0 | 4/2/0 | 0/0/0 | 8 | B2, DI | B2, DI | |
| 9 | | 1 | 0 | 0 | 0 | 0 | 1 | 0 | 3 | 1 | 0 | 3½ | 1/0/0 | 1/2/0 | 1/0/0 | 5 | MW | BB | |
| 10 | | 1 | 0 | 0 | 0 | 0 | 0 | 0 | 3 | 1 | 0 | 3½ | 1/0/0 | 4/2/0 | 1/0/0 | 8 | B3 | BB | |
| 11 | ✪✓ | 1 | 1 | 0 | 0 | 0 | 0 | 0 | 3 | 1 | 0 | 3½ | 1/0/0 | 4/2/0 | 1/0/0 | 8 | B3, DI | BB, DI | TriMADI$^{=}$ |
| 12 | | 1 | 0 | 0 | 0 | 1 | 0 | 0 | 3 | 1 | 2 | 4 | 3/0/3 | 4/2/2 | 1/0/0 | 11¼ | B3, MW | BB | |
| 13 | ✪✓ | 1 | 1 | 0 | 0 | 1 | 0 | 0 | 3 | 1 | 2 | 4 | 3/0/3 | 4/2/2 | 1/0/0 | 11¼ | B3, DI, MW | BB, DI | TriMADI$^{-}$ |
| 14 | | 1 | 0 | 1 | 0 | 0 | 1 | 0 | 3 | 2 | 0 | 4 | 1/1/0 | 1/2/0 | 1/0/0 | 6 | MW | WV | |
| 15 | | 1 | 0 | 1 | 0 | 0 | 0 | 0 | 3 | 2 | 0 | 4 | 1/1/0 | 4/2/0 | 1/0/0 | 9 | B3 | B2 | |
| 16 | | 1 | 1 | 1 | 0 | 0 | 0 | 0 | 3 | 2 | 0 | 4 | 1/1/0 | 4/2/0 | 1/0/0 | 9 | B3, DI | B2, DI | |
| 17 | | 1 | 0 | 1 | 0 | 1 | 0 | 0 | 3 | 2 | 2 | 4½ | 3/1/3 | 4/2/2 | 1/0/0 | 12¼ | B3, MW | B2 | |
| 18 | ✓ | 1 | 1 | 1 | 0 | 1 | 0 | 0 | 3 | 2 | 2 | 4½ | 3/1/3 | 4/2/2 | 1/0/0 | 12¼ | B3, DI, MW | B2, DI | |
| 19 | | 1 | 0 | 0 | 1 | 0 | 1 | 0 | 3 | 3 | 0 | 4½ | 1/1/0 | 1/2/0 | 1/1/0 | 7 | MW | MW | |
| 20 | | 1 | 0 | 0 | 1 | 0 | 0 | 0 | 3 | 3 | 0 | 4½ | 1/1/0 | 4/2/0 | 1/1/0 | 10 | B3 | B3 | |
| 21 | | 1 | 1 | 0 | 1 | 0 | 0 | 0 | 3 | 3 | 0 | 4½ | 1/1/0 | 4/2/0 | 1/1/0 | 10 | B3, DI | B3, DI | |
| 22 | | 1 | 0 | 0 | 1 | 1 | 0 | 0 | 3 | 3 | 2 | 5 | 3/1/3 | 4/2/2 | 1/1/0 | 13¼ | B3, MW | B3, MW | |
| 23 | ✪✓ | 1 | 1 | 0 | 1 | 1 | 0 | 0 | 3 | 3 | 2 | 5 | 3/1/3 | 4/2/2 | 1/1/0 | 13¼ | B3, DI, MW | B3, DI, MW | TriMADI |

FIG. 17a

TABLE 2

| *i* | -9 | -8 | -7 | -6 | -5 | -4 | -3 | -2 | -1 | 0 | 1 | 2 | 3 | 4 | 5 | 6 | 7 | 8 | 9 |
|---|---|---|---|---|---|---|---|---|---|---|---|---|---|---|---|---|---|---|---|
| *b* | -21 | -15 | -13 | -11 | -9 | -7 | -5 | -3 | -1 | 0 | 1 | 3 | 5 | 7 | 9 | 11 | 13 | 15 | 21 |
| *Angle* (°) | 174.6 | 172.4 | 171.3 | 169.7 | 167.5 | 164.1 | 158.2 | 146.3 | 116.6 | 90.0 | 63.4 | 33.7 | 21.8 | 15.9 | 12.5 | 10.3 | 8.7 | 7.6 | 5.4 |

TABLE 3

| *i* | -9 | -8 | -7 | -6 | -5 | -4 | -3 | -2 | -1 | 0 | 1 | .2 | 3 | 4 | 5 | 6 | 7 | 8 | 9 |
|---|---|---|---|---|---|---|---|---|---|---|---|---|---|---|---|---|---|---|---|
| Distance | 17 | 15 | 13 | 11 | 9 | 7 | 5 | 3 | 1 | 0 | 2 | 4 | 6 | 8 | 10 | 12 | 14 | 16 | 18 |

TABLE 4

| *i* | -9 | -8 | -7 | -6 | -5 | -4 | -3 | -2 | -1 | 0 | 1 | 2 | 3 | 4 | 5 | 6 | 7 | 8 | 9 |
|---|---|---|---|---|---|---|---|---|---|---|---|---|---|---|---|---|---|---|---|
| *TH_DIFF* | *TH5* | *TH5* | *TH5* | *TH4* | *TH3* | *TH2* | *TH2* | *TH2* | *TH1* | *TH1* | *TH1* | *TH2* | *TH2* | *TH2* | *TH3* | *TH4* | *TH5* | *TH5* | *TH5* |
| *TH1*=108, *TH2*=122, *TH3*=131, *TH4*=135, *TH5*=162 | | | | | | | | | | | | | | | | | | | |

TABLE 5

| Preference | Method |
|---|---|
| 1 (Recommended) | Disable angle detection and substitute top/bottom lines for out-of-bound (OOB) lines. |
| 2 | Disable angle detection and use default value (0) for OOB pixels. |
| 3 | Enable angle detection and substitute top/bottom line for OOB lines. |
| 4 | Enable angle detection and use default value (0) for OOB pixels. |

FIG. 17b

TABLE 6

| Parameter | Bits | Range | Default | Comment |
|---|---|---|---|---|
| ThreeLumaField | 1 | {0,1} | 1 | Enable/disable three-field luma deinterlacing (e.g. TriMADI mode) |
| AngleDetection | 1 | {0,1} | 1 | Enable/disable angle detection |
| TwoChromaField | 1 | {0,1} | 0 | Enable/disable using only 2 chroma fields in PRE and CUR |
| ThreeChromaField | 1 | {0,1} | 0 | Enable/disable using all 3 chroma fields in PRE, CUR and NXT |
| StatCheck | 1 | {0,1} | 1 | Enable/disable joint luma-chroma stationary check in theTriMADI mode |
| Weave | 1 | {0,1} | 0 | Force weave on luma (and maybe chroma) if set |
| Bob | 1 | {0,1} | 0 | Force bob on luma and chroma if set |
| HSCntReset | 1 | {0,1} | 0 | Enable/disable reset HSCnt |
| HSCntDefault | 2 | {0...3} | 0 | Default value to reset or initialize the HSCnt |
| TH1, TH2, TH3, TH4, and TH5 | 8 | Full range | Table 4 | Thresholds used in 4-bit angle detection. Values are multiplied by 16 (becomes 12-bit) for 8-bit angle detection |
| $c_3$ | 4 | {0..15} | 9 | Used in luma directional filter fitness check |
| $n_{scale}$ | 4 | {1...16} | 8 | Used in both luma and chroma blending. |
| $\Delta\tau$ | 2 | {2,4,8,16} | 8 | Used in luma blending when ThreeLumaField=0 |
| | | | 16 | Used in luma blending when ThreeLumaField=1 |
| $\tau_{scale}$ | 4 | {1...16} | 4 | Used in luma blending when ThreeLumaField=0 |
| | | | 8 | Used in luma blending when ThreeLumaField=1 |
| $\Delta\tau^c$ | 2 | {1,2,4,8} | 4 | Used in chroma blending when TwoChromaField=1 |
| | | | 8 | Used in chroma blending when ThreeChromaField=1 |
| $\tau^c_{Scale}$ | 4 | {1...16} | 4 | Used in chroma blending when TwoChromaField=1 |
| | | | 8 | Used in chroma blending when ThreeChromaField=1 |
| $c_1$ | 4 | {3...18} | 7 | Used in angle detection. |
| $c_2$ | 3 | {1...8} | 4 | Used in 4-bit angle detection |
| | 7 | {1...128} | 64 | Used in 8-bit angle detection |
| ActScale | 3 | {2...9} | 6 | Used in luma stationary check |
| ActOffset | 4 | {0...15} | 7 | Used in luma stationary check |
| MaxResidue | 3 | {12...19} | 15 | Used in luma stationary check |
| MinHistAngle | 2 | {0...3} | 2 | Used in joint luma-chroma stationary check |
| MinHistCenter | 2 | {0...3} | 2 | Used in both luma and chroma stationary check |
| MinHistAdjacent | 2 | {3...6} | 6 | Used in both luma and chroma stationary check |
| MinHistSum | 4 | {0...15} | 9 | Used in both luma and chroma stationary check |
| $ActScale^c$ | 3 | {9...16} | 13 | Used in chroma stationary check |
| $ActOffset^c$ | 4 | {0...15} | 7 | Used in chroma stationary check |
| $MaxResidue^c$ | 3 | {12...19} | 15 | Used in chroma stationary check |

FIG. 17c $$oneField^{Y} = Bob$$
$$oneField^{C} = !TwoChromaField \ \&\& \ !ThreeChromaField$$
$$threeField^{Y} = ThreeLumaField$$
$$threeField^{C} = ThreeChromaField$$
$$enableAngleDetection^{Y} = AngleDetection$$
$$enableStatCheck^{Y} = StatCheck$$
$$enableStatCheck^{C} = StatCheck \ \&\& \ ThreeChromaField$$
$$weaveTwoField^{Y} = Weave \ \&\& \ !ThreeLumaField$$
$$weaveTwoField^{C} = Weave \ \&\& \ TwoChromaField$$
$$weaveThreeField^{Y} = Weave \ \&\& \ ThreeLumaField$$
$$weaveThreeField^{C} = Weave \ \&\& \ ThreeChromaField$$

EQ. SET 1

$$x_{W2}[u][v] = PRE[u][v]$$

EQ. 2

$$noise = \left|PRE[u][v] - NXT[u][v]\right|$$
$$x_{W3} = x_{co} + \begin{cases} -noise & \text{if } x_{vf} - x_{co} < -noise \\ x_{vf} - x_{co} & \text{if } \left|x_{vf} - x_{co}\right| \leq noise \\ noise & \text{if } x_{vf} - x_{co} > noise \end{cases}$$

EQ. SET 3

FIG. 18a $$x_{vf} = \begin{bmatrix} -CUR[u-3][v] + 9 \cdot CUR[u-1][v] + \\ -CUR[u+3][v] + 9 \cdot CUR[u+1][v] + 8 \end{bmatrix} >> 4$$

EQ. 4

$$x_{df} = \begin{cases} x_{vf} & \text{if } \alpha = 0 \\ \begin{bmatrix} CUR[u-1][v+l] + CUR[u-1][v+l+1] + \\ CUR[u+1][v+l-b] + CUR[u+1][v+l-b+1] + 2 \end{bmatrix} >> 2 & \text{if } \alpha \neq 0 \end{cases}$$

EQ. 5

$$angleFit^{Y} = c_3 \cdot \begin{pmatrix} \left|CUR[u-1][v] - x_{df}\right| + \\ \left|CUR[u+1][v] - x_{df}\right| \end{pmatrix} \leq \left( \max\left[ gradient, \begin{vmatrix} CUR[u-1][v] - \\ CUR[u+1][v] \end{vmatrix} \right] << 4 \right)$$

EQ. 6

$$x_{blend \in \{B2, B3\}} = x_{co} + \mu \cdot (x_{vf} - x_{co})$$

EQ. 7

$$df = \max(\left|x_{cp} - x_{vf}\right|, \left|x_{cn} - x_{vf}\right|)$$

$$\mu = \begin{cases} 0 & \text{if } df < \tau \\ \frac{1}{\Delta\tau}(df - \tau) & \text{else if } df < \tau + \Delta\tau \\ 1 & \text{otherwise} \end{cases}$$

EQ. SET 8

FIG. 18b $$\tau_1 = \max\begin{pmatrix} |CUR[u-3][v] - CUR[u-1][v]|, \\ |CUR[u-1][v] - CUR[u+1][v]|, \\ |CUR[u+1][v] - CUR[u+3][v]| \end{pmatrix} >> 1$$

$$\tau_2 = \left[ 3 \cdot \min\left( \begin{matrix} \max\begin{pmatrix} |CUR[u-3][v] - CUR[u-1][v]|, \\ |CUR[u-1][v] - CUR[u+1][v]| \end{pmatrix}, \\ \max\begin{pmatrix} |CUR[u+1][v] - CUR[u+3][v]|, \\ |CUR[u-1][v] - CUR[u+1][v]| \end{pmatrix} \end{matrix} \right) \right] >> 2$$

$$\tau_3 = \min(\tau_1, \tau_2)$$

$$x_n = |PRE[u][v] - NXT[u][v]|$$

$$\tau = \max\left(0, \ (\tau_{Scale} \cdot \tau_3 - n_{Scale} \cdot x_n) >> 3\right)$$

EQ. SET 9

$$x_{W2}^K[cu][cv] = PRE^K[cu][cv]$$ EQ. 10

$$noise^K = \left|PRE^K[cu][cv] - NXT^K[cu][cv]\right|$$

$$x_{W3}^K = x_{co}^K + \begin{Bmatrix} -noise^K & \text{if } x_{vf}^K - x_{co}^K < -noise^K \\ x_{vf}^K - x_{co}^K & \text{if } \left|x_{vf}^K - x_{co}^K\right| \le noise^K \\ noise^K & \text{if } x_{vf}^K - x_{co}^K > noise^K \end{Bmatrix}$$ EQ. SET 11

$$x_{vf}^K = \left[CUR^K[cu-1][cv] + CUR^K[cu+1][cv] + 1\right] >> 1$$ EQ. 12

FIG. 18c $$x^K_{blend\in\{B2,B3\}} = x^K_{co} + \mu \cdot (x^K_{vf} - x^K_{co})$$ EQ. 13

$$df^K = \max(|x^K_{cp} - x^K_{vf}|, |x^K_{cn} - x^K_{vf}|)$$
$$\mu^K = \begin{cases} 0 & \text{if } df^K < \tau^K \\ \frac{1}{\Delta\tau^C}\left(df^K - \tau^K\right) & \text{else if } df^K < \tau^K + \Delta\tau^C \\ 1 & \text{otherwise} \end{cases}$$ EQ. SET 14

$$\tau_3 = \left(5 \cdot \left|CUR^K[cu-1][cv] - CUR^K[cu-1][cv]\right|\right) >> 3$$
$$x_n = \left|PRE^K[cu][cv] - NXT^K[cu][cv]\right|$$
$$\tau^K = \max\left(0, \left(\tau^C_{Scale} \cdot \tau_3 - n_{Scale} \cdot x_n\right) >> 3\right)$$ EQ. SET 15

$$DIFF[i] = \sum_{x=-W+1}^{W} \begin{pmatrix} |CUR[u-3][v+l+b+x] - CUR[u-1][v+l+x]| + \\ |CUR[u-1][v+l+x] - CUR[u+1][v+l-b+x]| + \\ |CUR[u+1][v+l-b+x] - CUR[u+3][v+l-2b+x]| \end{pmatrix}$$ EQ. 16

$$l = \begin{cases} 0 & \text{if } b = 0 \\ b/2 - 1 & \text{if } b < 0 \\ b/2 & \text{if } b > 0 \end{cases}$$ EQ. 17

FIG. 18d $$DIFF_{(u,v)}[i] = DIFF_{(u,v-1)}[i] - LeftBorder + RightBorder$$

$$\begin{aligned} LefBorder = & \left|CUR[u-3][v+l+b-W] - CUR[u-1][v+l-W]\right| + \\ & \left|CUR[u-1][v+l-W] - CUR[u+1][v+l-b-W]\right| + \\ & \left|CUR[u+1][v+l-b-W] - CUR[u+3][v+l-2b-W]\right| \end{aligned}$$

$$\begin{aligned} RightBorder = & \left|CUR[u-3][v+l+b+W] - CUR[u-1][v+l+W]\right| + \\ & \left|CUR[u-1][v+l+W] - CUR[u+1][v+l-b+W]\right| + \\ & \left|CUR[u+1][v+l-b+W] - CUR[u+3][v+l-2b+W]\right| \end{aligned}$$

EQ. SET 18

$$LEFT = \begin{cases} \alpha - 1 & \text{if } \alpha \geq -8 \\ -8 & \text{if } \alpha = -9 \end{cases} \qquad RIGHT = \begin{cases} \alpha + 1 & \text{if } \alpha \leq 8 \\ 8 & \text{if } \alpha = 9 \end{cases}$$

EQ. SET 19

$$UpLeft = CUR[u-1][v+l-W+1] \qquad UpRight = CUR[u-1][v+l+W]$$

$$DownLeft = CUR[u+1][v+l-b-W+1] \qquad DownRight = CUR[u+1][v+l-b+W]$$

EQ. SET 20

FIG. 18e $$statLum[S] = \begin{pmatrix} \left(hstatcnt_0[S] \geq 3 \,\&\&\, \left(hstatcnt_{+1}[S] + hstatcnt_{-1}[S]\right) \geq 3\right) \;\| \\ residue_{-1}[S] + residue_0[S] + residue_{+1}[S] < MaxResidue \end{pmatrix}$$
$$\&\&\left(hstatcnt_0[S] \geq 3 \;\|\; residue_0[S] < MaxResidue - 2\right)$$
$$\&\&\begin{pmatrix} hstatcnt_{-1}[S] \geq 3 \;\|\; hstatcnt_{+1}[S] \geq 3 \;\| \\ \left(residue_{-1}[S] + residue_{+1}[S]\right) < MaxResidue - 2 \end{pmatrix}$$

EQ. 21

WHERE S={0,1}, $$hstatcnt_k[S] = \sum_{i=Left[k]}^{Right[k]} \begin{Bmatrix} 0 \text{ if } tdiffact[u][v+i][S] \geq 0 \\ 1 \text{ if } tdiffact[u][v+i][S] < 0 \end{Bmatrix}$$
$$residue_k[S] = \sum_{i=Left[k]}^{Right[k]} \max\begin{pmatrix} 0, \\ tdiffact[u][v+i][S] \end{pmatrix}$$
$$Left[-1,0,+1] = \{-4,-1,2\},\ Right[-1,0,+1] = \{-2,1,4\}$$

EQ. SET 22

AND $$tdiffact[u][v][S] = \left|PRE[u][v] - NXT[u][v]\right| - act[u][v][S] - ActOffset$$
$$act[u][v][S] = \left(lumAct[u][v] * (ActScale + S)\right) >> 6$$
$$lumAct[u][v] = \max\left(cact[u][v], hact[u][v], vact[u][v]\right)$$

EQ. SET 23

$$cact[u][v] = \max\begin{pmatrix} \left|CUR[u-1][v] - CUR[u+1][v]\right|, \\ \left|CUR[u-1][v-1] - CUR[u+1][v-1]\right|, \\ \left|CUR[u-1][v+1] - CUR[u+1][v+1]\right| \end{pmatrix}$$

EQ. 24

$$hact[u][v] = \left[\min\left(hactPRE[u][v], hactNXT[u][v]\right) + 2\right] >> 2$$
$$hactPRE[u][v] = \left|PRE[u][v-1] - PRE[u][v]\right| + \left|PRE[u][v+1] - PRE[u][v]\right|$$
$$hactNXT[u][v] = \left|NXT[u][v-1] - NXT[u][v]\right| + \left|NXT[u][v+1] - NXT[u][v]\right|$$

EQ. SET 25

FIG. 18f $$vact[u][v] = \left\{ \max\left( \begin{array}{l} \left| \begin{array}{l} PRE[u-2][v]- \\ PRE[u][v] \end{array} \right| + \left| \begin{array}{l} PRE[u+2][v]- \\ PRE[u][v] \end{array} \right|, \\ \left| \begin{array}{l} PRE[u-2][v-1]- \\ PRE[u][v-1] \end{array} \right| + \left| \begin{array}{l} PRE[u+2][v-1]- \\ PRE[u][v-1] \end{array} \right|, \\ \left| \begin{array}{l} PRE[u-2][v+1]- \\ PRE[u][v+1] \end{array} \right| + \left| \begin{array}{l} PRE[u+2][v+1]- \\ PRE[u][v+1] \end{array} \right| \end{array} \right) + 1 \right\} >> 1 \qquad \text{EQ. 26}$$

$$\begin{array}{l} isLumAngleStat = \\ \quad !\left(isEdge[u][v]\ \&\&\ edgeFit[u][v]\right)\ || \\ \quad \left( \begin{array}{l} HSCnt[u-1][v] \geq MinHistAngle\ \&\& \\ HSCnt[u+1][v] \geq MinHistAngle \end{array} \right) \end{array} \qquad \text{EQ. 27}$$

$$\begin{array}{l} isStatHist = \\ \qquad HSCnt[u][v] \geq MinHistCenter \\ \&\& \left( \begin{array}{l} HSCnt[u-2][v] + HSCnt[u-1][v] \geq MinHistAdjacent\ || \\ HSCnt[u-1][v] + HSCnt[u][v] \geq MinHistAdjacent\ || \\ HSCnt[u][v] + HSCnt[u+1][v] \geq MinHistAdjacent\ || \\ HSCnt[u+1][v] + HSCnt[u+2][v] \geq MinHistAdjacent \end{array} \right) \\ \&\& \left( \begin{array}{l} HSCnt[u-2][v] + HSCnt[u-1][v] + HSCnt[u][v] + \\ HSCnt[u+1][v] + HSCnt[u+2][v] \end{array} \right) \geq MinHistSum \end{array}$$

EQ. 28

$$isStationary^{Y} = statLum[0]\ \&\&\ isStatHist\ \&\&\ isLumAngleStat \qquad \text{EQ. 29}$$

FIG. 18g $$statC^{K\in\{Cb,Cr\}} = \begin{pmatrix} \left(hstatcnt_0^K \geq 3 \,\&\&\, \left(hstatcnt_{-1}^K + hstatcnt_{+1}^K\right) \geq 1\right) \| \\ residue_{-1}^K + residue_0^K + residue_{+1}^K < MaxResidue^C \end{pmatrix} \\ \&\& \left(hstatcnt_0^K \geq 3 \,\|\, residue_0^K < MaxResidue^C - 2\right) \\ \&\& \begin{pmatrix} hstatcnt_{-1}^K == 1 \,\|\, hstatcnt_{+1}^K == 1 \,\| \\ \left(residue_{-1}^K + residue_{+1}^K\right) < MaxResidue^C - 2 \end{pmatrix}$$

EQ. SET 30

$$hstatcnt_m^K = \sum_{i=LeftChrom[m]}^{RightChrom[m]} \begin{Bmatrix} 0 \text{ if } tdiffact^K[cu][cv+i] \geq 0 \\ 1 \text{ if } tdiffact^K[cu][cv+i] < 0 \end{Bmatrix}$$

$$residue_m^K = \sum_{i=LeftChrom[m]}^{RightChrom[m]} \max\left(0, tdiffact^K[cu][cv+i]\right)$$

$$LeftChrom[-1,0,+1] = \{-2,-1,2\},\ RightChrom[-1,0,+1] = \{-2,1,2\}$$

EQ. SET 31

$$tdiffact^K[cu][cv] = actPN^K[cu][cv] - actChrom^K[cu][cv] - ActOffset^C$$

$$actPN^K[cu][cv] = \min\begin{pmatrix} \left|PRE^K[cu][cv] - NXT^K[cu][cv]\right|, \\ \left|lpPRE^K[cu][cv] - lpNXT^K[cu][cv]\right| \end{pmatrix}$$

$$lpPRE^K[cu][cv] = \begin{pmatrix} PRE^K[cu][cv-1] + 2 \cdot PRE^K[cu][cv] + \\ PRE^K[cu][cv+1] + 2 \end{pmatrix} >> 2$$

$$lpNXT^K[cu][cv] = \begin{pmatrix} NXT^K[cu][cv-1] + 2 \cdot NXT^K[cu][cv] + \\ NXT^K[cu][cv+1] + 2 \end{pmatrix} >> 2$$

EQ. SET 32

$$actChrom^K[cu][cv] = \left(chromAct^K[cu][cv] * ActScale^C\right) >> 6$$

$$chromAct^K[cu][cv] = \max\left(cact^K[cu][cv], hact^K[cu][cv]\right)$$

EQ. SET 33

FIG. 18h $$hact^K[cu][cv] = \left\{ \min\left( \begin{pmatrix} |PRE^K[cu][cv] - PRE^K[cu][cv-1]| + \\ |PRE^K[cu][cv] - PRE^K[cu][cv+1]| \end{pmatrix}, \begin{pmatrix} |NXT^K[cu][cv] - NXT^K[cu][cv-1]| + \\ |NXT^K[cu][cv] - NXT^K[cu][cv+1]| \end{pmatrix} \right) + 2 \right\} >> 2$$

EQ. 34

$$cact^K[cu][cv] = \max\begin{pmatrix} |CUR^K[cu-1][cv-1] - CUR^K[cu+1][cv-1]|, \\ |CUR^K[cu-1][cv-1] - CUR^K[cu+1][cv]|, \\ |CUR^K[cu-1][cv-1] - CUR^K[cu+1][cv+1]|, \\ |CUR^K[cu-1][cv] - CUR^K[cu+1][cv-1]|, \\ |CUR^K[cu-1][cv] - CUR^K[cu+1][cv]|, \\ |CUR^K[cu-1][cv] - CUR^K[cu+1][cv+1]|, \\ |CUR^K[cu-1][cv+1] - CUR^K[cu+1][cv-1]|, \\ |CUR^K[cu-1][cv+1] - CUR^K[cu+1][cv]|, \\ |CUR^K[cu-1][cv+1] - CUR^K[cu+1][cv+1]| \end{pmatrix}$$

EQ. 35

FIG. 18i $$isStationary^{K} = statC^{K} \ \&\& \ isStatHist$$

EQ. 36

$$\begin{aligned} notStationary &= !stat^{Y} \ || \ \left(!stat^{Cb} \ \&\& \ !stat^{Cr}\right) \\ weakStationary &= stat^{Y} \ \&\& \ \left(stat^{Cb} \wedge stat^{Cr}\right) \\ strongStationary &= stat^{Y} \ \&\& \ stat^{Cb} \ \&\& \ stat^{Cr} \\ HSCnt[u][v] &= \begin{cases} 0 & \text{if } notStationary \\ HSCnt[u][v] >> 1 & \text{if } weakStationary \\ \min\left(HSCnt[u][v]+1, 3\right) & \text{if } strongStationary \end{cases} \end{aligned}$$

EQ. SET 37

$$x_{df}^{K} = \frac{1}{2}\left(CUR^{K}[cu-1][cv+kU] + CUR^{K}[cu+1][cv+kD] + 1\right)$$

REDUCED MEMORY AND BANDWIDTH MOTION ADAPTIVE VIDEO DEINTERLACING

CROSS REFERENCE TO RELATED APPLICATIONS

The present application is related to co-pending U.S. application Ser. No. 10/727,476 filed Dec. 4, 2003, now U.S. Pat. No. 7,170,561, which is hereby incorporated by reference in its entirety.

FIELD OF THE INVENTION

The present invention relates to video deinterlacing generally and, more particularly, to a reduced memory and bandwidth motion adaptive video deinterlacing technique.

BACKGROUND OF THE INVENTION

An interlaced scan format was developed to reduce bandwidth for early video systems and has been widely adopted and used ever since. Deinterlacing is a set of methods used to convert the interlaced video fields into a raster frame format. The deinterlacing methods are commonly used in modern displays that support a progressive scan approach. Conventional deinterlacing methods introduce artifacts, such as line flicker and serration of moving edges. The artifacts are less noticeable in traditional analog cathode ray tube (CRT) displays than in modern high-definition and progressive scan displays. However, as the mainstream display technology shifts from CRT to liquid crystal display (LCD), plasma and other high resolution, high contrast technologies, the artifacts introduced by the deinterlacing become more noticeable and annoying to consumers.

Conventional deinterlacing methods include a "weave" process and a "bob" process. The weave deinterlacing generates a frame from a current field by copying missing lines from an opposite-parity field. Unfortunately, the weave method causes noticeable artifacts in areas of movement within the picture. The bob method performs vertical interpolations of the current field lines to fill the missing lines of the resulting frame. However, the bob method causes flickering lines and blurs the picture.

SUMMARY OF THE INVENTION

The present invention concerns a method for deinterlacing. The method generally comprises the steps of (A) generating a frame by deinterlacing a current field in a first of a plurality of modes, (B) generating the frame by deinterlacing using both of the current field and an opposite-parity field in a second of the modes and (C) generating the frame be deinterlacing using all of the current field, the opposite-parity field and another field in a third of the modes, wherein the method uses at least two of the modes.

The objects, features and advantages of the present invention include providing a reduced memory and bandwidth motion adaptive video deinterlacing technique that may provide (i) a pixelwise joint luma-chroma motion adaptive stationary check method, (ii) an edge dependent directional filter, (iii) a unified luma and chroma deinterlacing architecture, (iv) an implementation-friendly stationary check method, (v) enablement of independent deinterlacing for all 3 channels (e.g., one luma channel and two chroma channels), (vi) up to 23 operation modes, (vii) enable customization to support a wide range of potential bandwidth and line access requirement limitations and/or (viii) an improved directional filter that enhances the sharpness for angles down to 5.4 degrees.

BRIEF DESCRIPTION OF THE DRAWINGS

These and other objects, features and advantages of the present invention will be apparent from the following detailed description and the appended claims and drawings in which:

FIG. 1 is a diagram of conventional luma indexing and chroma indexing for a 4:2:2 format picture;

FIG. 2 is a diagram of conventional luma indexing and chroma indexing for a 4:2:0 format picture;

FIGS. 17*a*-17*c* are tables; and

FIGS. 18*a*-18*j* are equations.

DETAILED DESCRIPTION OF THE PREFERRED EMBODIMENTS

Figure 3:
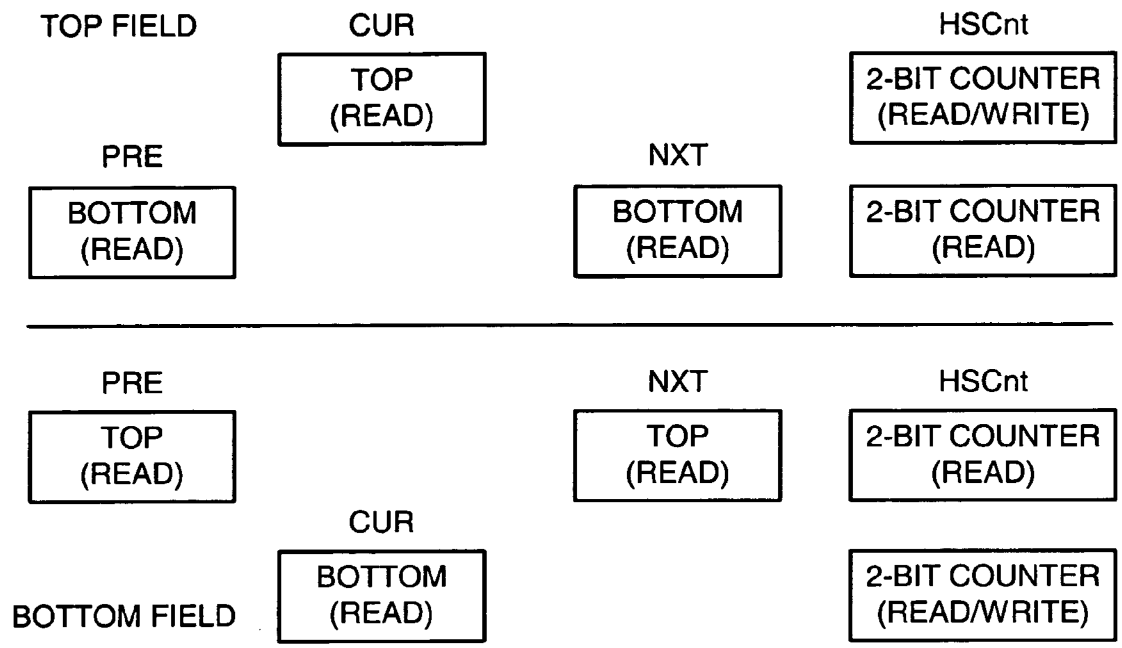
FIG. 3 is a block diagram of available fields and counters.

The present invention may be referred to as a third generation motion adaptive deinterlacing (TriMADI) architecture. The TriMADI architecture generally provides a pixelwise joint luminance-chrominance stationary check, an improved luminance (luma) low angle prediction compared with conventional approaches, and an improved chrominance (chroma) deinterlacing compared with conventional approaches. The TriMADI architecture generally achieves a reliable still pixel detection and pixel accurate weave for deinterlacing. The architecture generally includes a look-ahead of a next opposite-parity field and a multi-bit (e.g., 2-bit) stationary check counter for each output frame pixel (per luma sample).

Computations performed by the TriMADI technique may be the same regardless of the parity of the current field (e.g., an odd parity field or an even parity field). For simplicity of description, (i) a current field (e.g., CUR) may be considered a top field and (ii) both a previous field (e.g., PRE) and a next field (e.g., NXT) may be considered bottom fields. The field CUR generally comprises multiple lines, numbered 0, 2, 4, . . . , 2N−2 (e.g., even parity). Each of the field PRE and the field NXT generally comprises multiple lines, numbered 1, 3, 5, . . . , 2N−1 (e.g., odd parity), where N may be the number of available lines in each field. Deinterlacing generally constructs the "missing" lines in the field CUR, (e.g., line numbers 1, 3, 5, . . . , 2N−1), that form a complete frame of 2N lines when combined with the available lines in the field CUR.

The TriMADI architecture generally includes an angle-based deinterlacing technique with stationary check and a bidirectional (e.g., 3-dimensional) blending and weave for luma samples and chroma samples. An Input/Output section below generally covers (i) the fields used by the technique, (ii) the pixel input/output (I/O), including stationary check bits and (iii) the pixels used by the technique. A flowchart of the technique is discussed in a TriMADI Architecture section below. Detailed descriptions of most blocks in the flowchart are generally described in a Luma Deinterlacing Component section (for luma) and a Chroma Deinterlacing Component section (for chroma). A Luma Angle Detection section and a Pixelwise Stationary Check section generally specify an angle-detection technique and a stationary check technique.

Referring to FIGS. 1 and 2, diagrams of conventional luma indexing and chroma indexing for a 4:2:2 format picture (FIG. 1) and a 4:2:0 format picture (FIG. 2) are shown. As a convention herein, (i) (u,v) may be used to denote a current output position of the luma (Y channel) samples, (ii) (cu,cv) is generally used to denote a current output position of the chroma samples, (iii) superscript Y may be used to denote a luma channel, (iv) superscript C may be used to denote both chroma channels simultaneously and (v) superscript K is generally used to denote one of the chroma channels, either a Cb (blue) channel or a Cr (red) channel.

The TriMADI architecture generally uses a standard relationship between (u,v) and (cu,cv). For the 4:2:2 format: cu=u and cv=v>>1, as illustrated in FIG. 1. For 4:2:0 format: cu=u>>1 and cv=v>>1, as illustrated in FIG. 2. The horizontal positions of the chroma pixels are generally located at even luma horizontal positions. The standard relationships are conventionally used by an MPEG-2 standard, an MPEG-4 standard, and an H.264 standard. Although the above relationships between the luma indexing and the chroma indexing may be slightly different in other standards (e.g., MPEG-1), the TriMADI technique may still be implemented with a slight change in performance.

Input/Output Section

Referring to FIG. 3, a block diagram of available fields and counters is shown. Where the current field CUR that has been read from a memory is a top field, both the previous field PRE and the next field NXT may be bottom fields, as shown in the top half of FIG. 3. Where the current field CUR is a bottom field, both the previous field PRE and the next field NXT may be top fields, as shown in the bottom half of FIG. 3. Generally, the field CUR has an opposite parity from both the field PRE and the field NXT. The field PRE generally has the same parity as the field NXT. For the first field and the last field of a video sequence, only a single opposite parity field is available. In such cases, the single available opposite field may serve as both the next field NXT and the previous field PRE.

A stationary counter (e.g., HSCnt [0-3]) may be provided for each of same-parity luma samples and the opposite-parity luma samples. In some embodiments, the counters HSCnt may use multiple (e.g., 2 bits) for each frame luma sample. The bits used to count the current field CUR samples may be both readable and writable to a memory under the TriMADI architecture. The bits used to count the previous field PRE samples and the next field NXT samples may be readable from the memory under the TriMADI architecture.

Referring to FIG. 17*a*, a Table 1 for input criteria for the TriMADI architecture is shown. The TriMADI architecture generally supports many (e.g., 23) operational modes. The actual input field criteria may be different in each mode. FIG. 3 and the following sections generally show the criteria in a worst case scenario (e.g., a mode 22 and a mode 23). Detailed input criteria for each mode may be found in Table 1.

For each current field CUR (i) a single output frame may be generated (e.g., deinterlacing is performed) and (ii) the 2-bit stationary counters HSCnt [0-3] may be updated for each same-parity field pixel. The counters HSCnt are generally updated in the TriMADI modes where a stationary check is enabled. The stationary check may be enabled when a control signal (e.g., StatCheck) is set to a predetermined value (e.g., 1).

Figure 4:
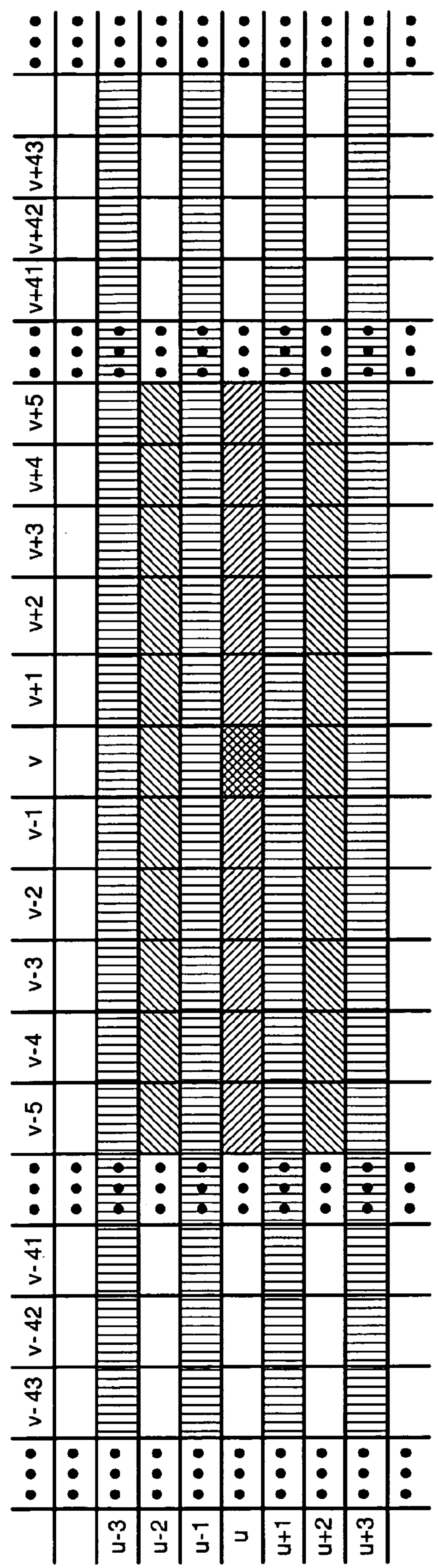
FIG. 4 is a diagram of example luma pixels used in deinterlacing.

Referring to FIG. 4, a diagram of example luma pixels used in deinterlacing is shown. Pixels used from the current field CUR may be highlighted with vertical striping. Pixels used from the previous field PRE may be highlighted with diagonal stripping (both lower-left to upper-right and upper-left to lower-right). Pixels used from the next field NXT may be highlighted with the diagonal stripping from upper-left to lower-right (overlapping some of the pixels of the previous field PRE). A missing pixel at a current location (u,v) may be highlighted with a diamond pattern.

To construct the missing luma pixel at the current position (u,v) in the current field CUR, the following luma pixels are generally assumed to be available. In the current field CUR, the pixels at positions (i,j) should be available, where $i \in \{u-3, u-1, u+1, u+3\}$, and $j \in \{v-43, v-42, \ldots, v+42, v+43\}$. In the previous field PRE, pixels at the locations (i,j) should be available, where $i \in \{u-2, u, u+2\}$ and $j \in \{v-5, v-4, \ldots, v+4, v+5\}$. For pixels in the next field NXT, pixels at the locations (i,j) should be available, where i=u and $j \in \{v-5, v-4, \ldots, v+4, v+5\}$. Three lines are generally used in the previous field PRE. A single line may be used in the next field NXT. In some embodiments, the field NXT may be replaced by a same-parity field occurring earlier in time than the previous PRE.

Figure 5:
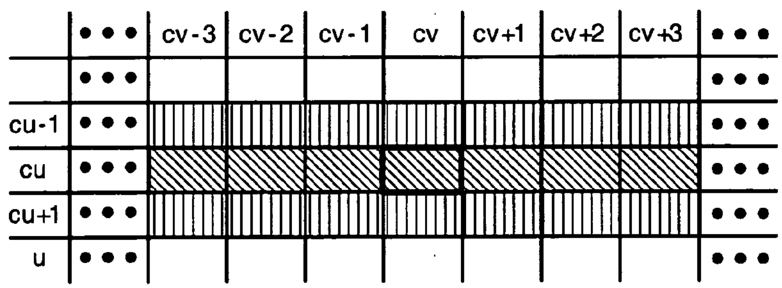
FIG. 5 is a diagram of example chroma pixels used in deinterlacing.

Referring to FIG. 5, a diagram of example chroma pixels used in deinterlacing is shown. Chroma pixels used in the current field CUR are generally highlighted with vertical stripping. Pixels from both the previous field PRE and the next field NXT may be highlighted with diagonal stripping.

To construct a missing chroma pixel at a current position (cu,cv) in the current field CUR, the following chroma pixels are generally assumed to be available. In the current field CUR, pixels at the locations (i,j) should be available, where $i \in \{cu-1, cu+1\}$, and $j \in \{cv-3, cv-2, \ldots, cv+2, cv+3\}$. For pixels in the previous field PRE and for pixels in the next field NXT, pixels at the locations (i,j) should be available, where i=cu and $j \in \{cv-3, cv-2, \ldots, cv+2, cv+3\}$.

Handling Out-of-Bound (OOB) Conditions

Unavailable pixels to the left or to the right of field boundaries may always assumed to be 0 (zero) for luma and 128 for chroma. For unavailable lines above or below the boundaries of a field (e.g., outside the active video region), two methods may be available to handle the out-of-bound pixels. In the first method for unavailable lines above the top boundary, a top-most line of video may be substituted for the unavailable lines. For example, the pixels at positions (−1,v), (−2,v), (−3,v), etc. may be replaced by the pixel at the position (0,v). Similarly, for unavailable lines below the bottom boundary, the bottom-most line of video may be substituted for the missing lines. In the second method, all pixels outside the field boundaries may be set to default values (e.g., 0 for luma and 128 for chroma).

The TriMADI technique generally uses vertically adjacent counters HSCnt. Thus, no counters HSCnt may be implemented for pixels outside the left boundary or outside the right boundary. For unavailable counters HSCnt in the lines above the top frame boundary, the counters HSCnt may be substituted with the counters HSCnt of the top line. Similarly, unavailable counters HSCnt for the lines below the bottom frame boundary may be substituted with the counters HSCnt of the bottom line. Unlike for handling out-of-bounds pixels, the counters HSCnt may not be substituted with a default value (such as 0 or 3). Default values may cause equation 28 to generate an erroneous flag (e.g., isStatHist), and hence incorrect flags (e.g., $isStationary^{Y}$, $isStationary^{Cb}$ and $isStationary^{Cr}$) could be used by the deinterlacing technique.

TriMADI Architecture

TriMADI offers multiple (e.g., 23) modes of operation, enabling customization to support a wide range of potential bandwidth and line access design limitations. Table 1 generally lists all modes supported by the TriMADI architecture. Table 1 may group the modes based on a bandwidth consumption of each mode. Except for the first two modes, the TriMADI bandwidths may have ½ luma field increments. The tables shows bandwidth and lines for reads, but not for writes. For all modes with a stationary check flag (e.g., StatCheck) disabled (e.g., false), the write bandwidth is zero (e.g., no memory write may be performed). For all modes with the stationary check flag StatCheck enabled (e.g., true), the write bandwidth is generally ¼ luma field for writing the updated 2-bit counts HSCnt back to memory (e.g., RAM). When the stationary check flag StatCheck is enabled, the Lines Accessed columns shown in Table 1 may not include the one-bit linestore used for the 4:2:0 format.

For each bandwidth, the best mode is generally marked with ✓ in the Note column. As bandwidth increases, the output quality generally increases. Thus, with all the modes available, the table may be used as a guideline to choose a best mode based on the bandwidth and line storage available.

Furthermore, 5 of the modes comprise recommended modes (e.g., marked with ✪). As the bandwidth increases, the recommended modes may offer successive and visible quality improvements. A best overall mode may be referred to as a TriMADI mode (e.g., mode 23 in Table 1).

As shown in FIG. 17*a*, each mode may be uniquely specified by multiple (e.g., 7) 1-bit control signals: (i) ThreeLumaField (e.g., T), (ii) angleDetection (e.g., A), (iii) TwoChromaField (e.g., C2), (iv) ThreeChromaField (e.g., C3), (v) StatCheck (e.g., S), (vi) weave (e.g., W) and (vii) bob (e.g., B). In the Mode Description columns, BB may indicate bob with 1 field, WV generally indicates weave with 2 fields, B2 is a blend with 2 fields, B3 is a blend with 3 fields, DI may indicate a directional interpolation and MW is a median weave with 3 fields. The Total column may be relative to a single 4:2:0 luma field/line. Not all combinations of the control signal may be valid. All valid modes supported by the TriMADI architecture are generally listed in Table 1. Two extra control signals (e.g., HSCntReset and HSCntDefault) may be used to enable/disable reset of the stationary counters HSCnt and the reset values.

The following signals and/or flags may be defined by the TriMADI architecture. The control signal (or flag) ThreeLumaField is generally used to allow backward compatibility with earlier techniques and override modes (e.g., traditional weave and bob). The TriMADI technique generally uses the same number or a fewer number of chroma fields than luma fields. The TriMADI technique generally does not use more chroma fields than luma fields.

The control signal (or flag) Bob may be used to support external scene change detect. If the signal Bob is true, a bob deinterlace may be used to generate the output frame based on the current field. Bob generally spatially interpolates a field to generate a frame. Traditionally, the bob deinterlacing performs spatial filtering on the pixel(s) above and below to produce the missing pixel(s). The spatial filtering may be referred to as a vertical filtering. Besides supporting the traditional bob method (when AngleDetection=false), the TriMADI technique generally supports an alternative bob method (when AngleDetection=true) that may reduce an edge jaggyness by performing directional interpolation based on the angle detected. The alternative bob mode (referred as $bob^{+}$) may use the same bandwidth as the traditional bob method with a slight increase in line storage. The bob method is generally used when signal threeLumaField is false. $Bob^{+}$ may spatially interpolation vertically and diagonally.

The control signal (or flag) Weave may be used to support external picture stillness detection, such as that in an inverse telecine. The weave method generally performs (i) a traditional two-field weave (e.g., field insertion) if two fields are available and (ii) a three-field median weave (as used by the stationary check) if three fields are available. As shown in FIG. 17*a*, TriMADI generally supports a total of 5 weave methods depending on the number of fields available: (i) two-field weave on luma and bob on chroma, (ii) two-field weave on both luma and chroma (traditional weave), (iii) three-field median-weave on luma and bob on chroma, (iv) three-field median-weave on luma and two-field weave on chroma and (v) three-field median-weave on both luma and chroma. Weave is generally interleaving the pixels from a top field(s) and a bottom field(s) to form a frame. A median weave may use 3 fields, but typically weave may use only a top field and a bottom field. $Weave^{-}$ generally weaves the luma but bobs the chroma to save bandwidth (reading the additional chroma fields). MADI generally blends between weave and bob adaptively on a pixel basis. ReMADI may be a blend between $bob^{+}$ and weave on a pixel basis. TriMADI may also use stationary checks between adjacent same-parity fields to improve the adaptive selection between $bob^{+}$ and weave on a pixel basis.

If the control signal (or flag) AngleDetection is true, an angle detection operation may be enabled. Based on the detected angle, directional interpolation is generally used to produce the missing sample. Directional interpolation generally reduces the jaggyness of the angular contents. If the control signal AngleDetection is false, the angle detection operation may be disabled and a default angle (e.g., 90°) is used by the rest of the TriMADI technique.

A set of control signals (or flags) (e.g., TwoChromaField and ThreeChromaField) may be used to control a number of chroma fields used by the TriMADI method. If both of the signal TwoChromaField and the signal ThreeChromaField are false, a single chroma field of the current field CUR is generally used and a bob method (either vertical filtering or directional interpolation) may be used to produce the missing chroma sample. If only the signal TwoChromaField is true, the chroma fields of the previous field PRE and the current field CUR may be used by the TriMADI method. If only the signal ThreeChromaField is true, the chroma fields of the previous field PRE, the current field CUR and the next field NXT may be used by the TriMADI method. Generally, the signal TwoChromaField and the signal ThreeChromaField should not be true at the same time. The signal ThreeChromaField may be used when the signal ThreeLumaField is true. If the signal ThreeLumaField is false, the signal ThreeChromaField may also be false.

The signal (or flag) StatCheck may be used to enable/disable the stationary check method. If the signal StatCheck is true, the stationary check method may be enabled to improve a performance over areas that have little change over time. The stationary check method generally controls the signals $isStationary^{Y}$, $isStationary^{Cb}$ and $isStationary^{Cr}$, which may be used by the deinterlacing technique. The signal StatCheck is generally used when the signal ThreeLumaField is true since the stationary check accesses to both the previous field PRE and next field NXT. Thus, if the signal ThreeLumaField is false, the signal StatCheck may also be false.

The control signal (or flag) HSCntReset may be used to enable/disable reset of the stationary check counters HSCnt. The control signal (or flag) HSCntDefault generally provides a 2-bit default value (e.g., 0 to 3) for the reset value. If the signal HSCntReset is false, the value in the signal HSCnt may be loaded from the memory and stored in a line buffer. Otherwise, the value in the signal HSCntDefault is generally used to initialize a HSCnt line buffer. If the signal HSCntReset is true, the memory may not be read to retrieve the values of the counters HSCnt since the values may be overridden by the default values in the signal HSCntDefault.

On startup, or when the signal StatCheck is toggled from 0 to 1, the method may first put the override field (e.g., top) to 0 for the counter that matches the parity of the first processed field (e.g., top) and then put the other (e.g., bottom) override field to zero for the counter that matches the parity of the second processed field. As such, control software and/or hardware implementing the TriMADI method should set HSCntReset=true, and HSCntDefault=0. Instead of resetting the counters HSCnt to 0, the control software/hardware may reset the counters HSCnt to 3 (e.g., HSCntReset=true and HSCntDefault=3) if the signal StatCheck is toggled from 0 to 1 and Weave is toggled from 1 to 0. The above may be performed where force weaving is used in the previous field and stationary check is just enabled, because externally controlled weaving is usually an indication that the recent fields were stationary. Thus, resetting the counters HSCnt to the default value of 3 may reflect the stationary status better than resetting to 0 (e.g., rebuilding the stationary counter HSCnt from scratch). Furthermore, the external control signals should only be changed at the field boundaries or at startup. The control signals should not be changed while deinterlacing a field.

Figure 6A:
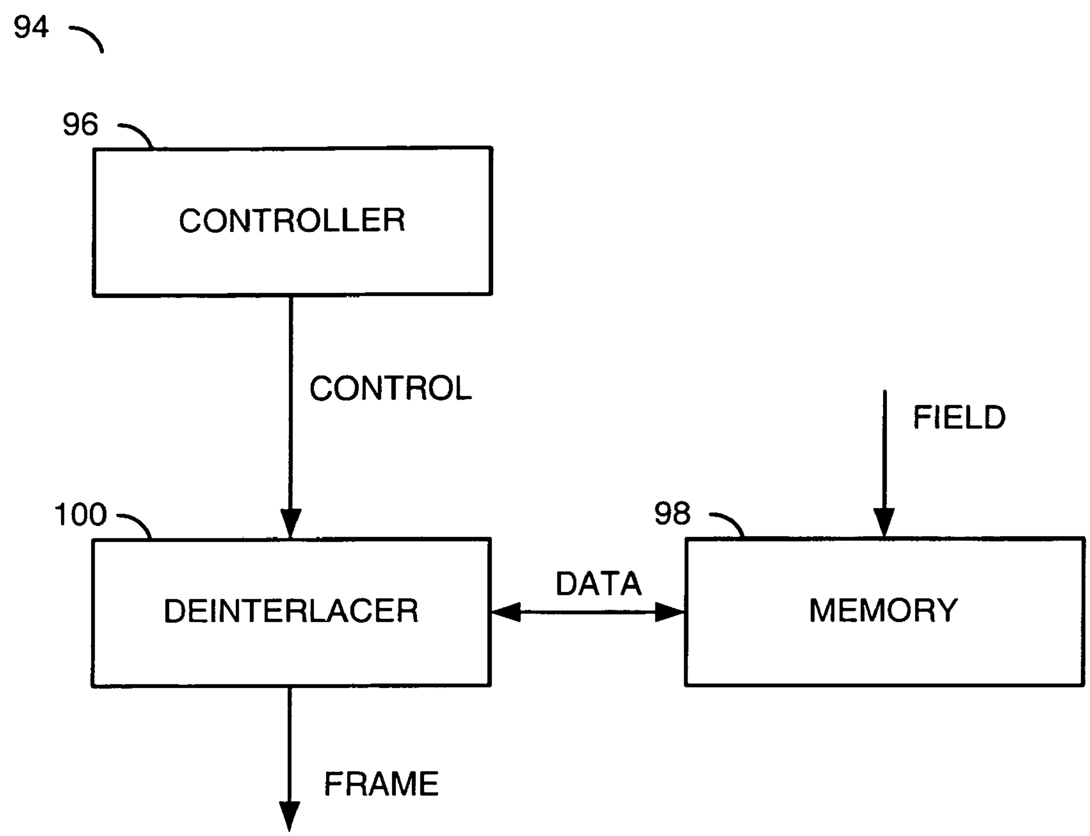
FIG. 6*a* is a block diagram of an example system implementing a deinterlacing technique in accordance with a preferred embodiment of the present invention.

Referring to FIG. 6*a*, a block diagram of an example system 94 implementing the TriMADI technique in accordance with a preferred embodiment of the present invention is shown. The system 94 generally comprises a circuit (or module) 96, a circuit (or module) 98 and a circuit (or module) 100. A set of signals (e.g., CONTROL) may be transferred from the circuit 96 to the circuit 100. A signal (e.g., DATA) may be exchanged between the circuit 98 and the circuit 100. A signal (e.g., FRAME) may be generated and presented by the circuit 100. A signal (e.g., FIELD) may be received by the circuit 98.

The circuit 96 may be implemented as a controller circuit. The circuit 96 may be operational to generate multiple control signals, collectively referred to as the signal CONTROL. The signal CONTROL generally comprises the signals ThreeChromaFIeld, TwoChromaField, ThreeLumaField, AngleDetection, BOB, WEAVE, StatCheck, HSCntReset and HSCntDefault. The components of the signal CONTROL generally enable the circuit 100 to operate using a previous field and a next field separately for one or more luminance fields and one or more chrominance fields.

The circuit 98 may be implemented as a random access memory (RAM) circuit. The circuit 98 may be operational to buffer one or more fields at a time as received in the signal FIELD for use by the circuit 100 in a deinterlacing operation. The circuit 98 may also be configured to store the various counters HSCnt.

The circuit 100 may be implemented as a deinterlacing circuit. The circuit 100 may be operational to generate a frame in the signal FRAME by deinterlacing the fields received in the signal DATA using at least two of the modes. The group of modes are generally illustrated in Table 1 (FIG. 17*a*) and discussed in detail below.

Figure 6B:
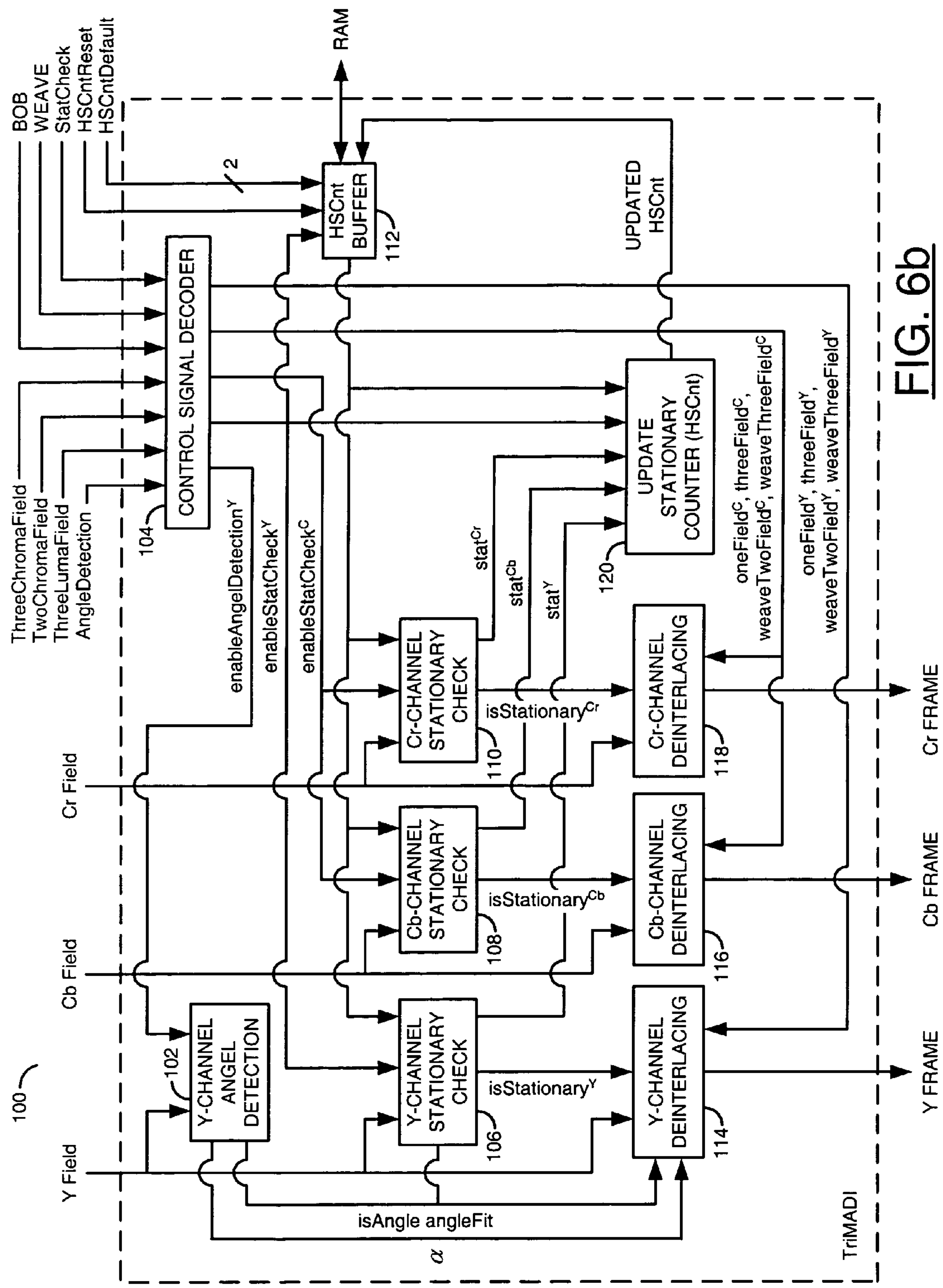
FIG. 6*b* is a detailed block diagram of an example implementation of a deinterlacing circuit.

Referring to FIG. 6*b*, a detailed block diagram of an example implementation of the circuit 100 is shown. The control signals are generally shown in thin lines and the data signals are generally shown in thick lines. The circuit 100 generally comprises a Y-channel angle detection block (or module) 102, a control signal decoder block (or module) 104, a Y-channel stationary check block (or module) 106, a Cb-channel stationary check block (or module) 108, a Cr-channel stationary check block (or module) 110, a HSCnt buffer block (or module) 112, a Y-channel deinterlacing block (or module) 114, a Cb-channel deinterlacing block (or module) 116, a Cr-channel deinterlacing block (or module) 118 and an update stationary counter block (or module) 120.

The circuit 100 is generally controlled by several internal control signals: a signal (e.g., $enableAngleDetection^{Y}$), a signal (e.g., $enableStatCheck^{Y}$), a signal (e.g., $enableStatCheck^{C}$), a signal (e.g., $weaveTwoField^{Y}$), a signal (e.g., $weaveTwoField^{C}$), a signal (e.g., $weaveThreeField^{Y}$), a signal (e.g., $weaveThreeField^{C}$), a signal (e.g., $oneField^{Y}$), a signal (e.g., $oneField^{C}$), a signal (e.g., $threeField^{Y}$) and a signal (e.g., $threeField^{C}$). The internal control signals may be decoded by the control signal decoder block 104 using the external control signals according to equation set 1, as shown in FIG. 18*a*. Furthermore, the following control signals may be internally generated by the angle detection block 102 and the stationary check blocks 106, 108 and 110: a signal (e.g., isAngle), a signal (e.g., angleFit), a signal (e.g., $\alpha$), a signal (e.g., $stat^{Y}$), a signal (e.g., $stat^{Cb}$), a signal (e.g., $stat^{Cr}$), a signal (e.g., $isStationary^{Y}$), a signal (e.g., $isStationary^{Cb}$) and a signal (e.g., $isStationary^{Cr}$).

For the Y channel, an angle detection may be performed by the angle detection block 102 to determine if a strong angular correlation exists between the upper 2 luma lines and the lower 2 luma lines. The angular information may then be used by the luma stationary check block 106 and deinterlacing block 114. The angle detection is generally performed for the luma channel but optionally may not be performed for the chroma channels.

Next, the circuit 100 generally uses a stationary checking method in the stationary check blocks 106, 108 and 110 to distinguish stationary (e.g., still) pixels from non-stationary pixels. The results of the stationary checks (e.g., the signals $isStationary^{Y}$, $isStationary^{Cb}$ and $isStationary^{Cr}$) may be passed to the deinterlacing blocks 114, 116 and 118, respectively. Although the stationary check may be performed independently for all 3 channels, the stationary counter HSCnt for the current pixel location is generally updated jointly for 3 channels. A single value of the counter HSCnt may be used by the stationary check blocks 106, 108 and 110 for all 3 channels.

Figure 7:
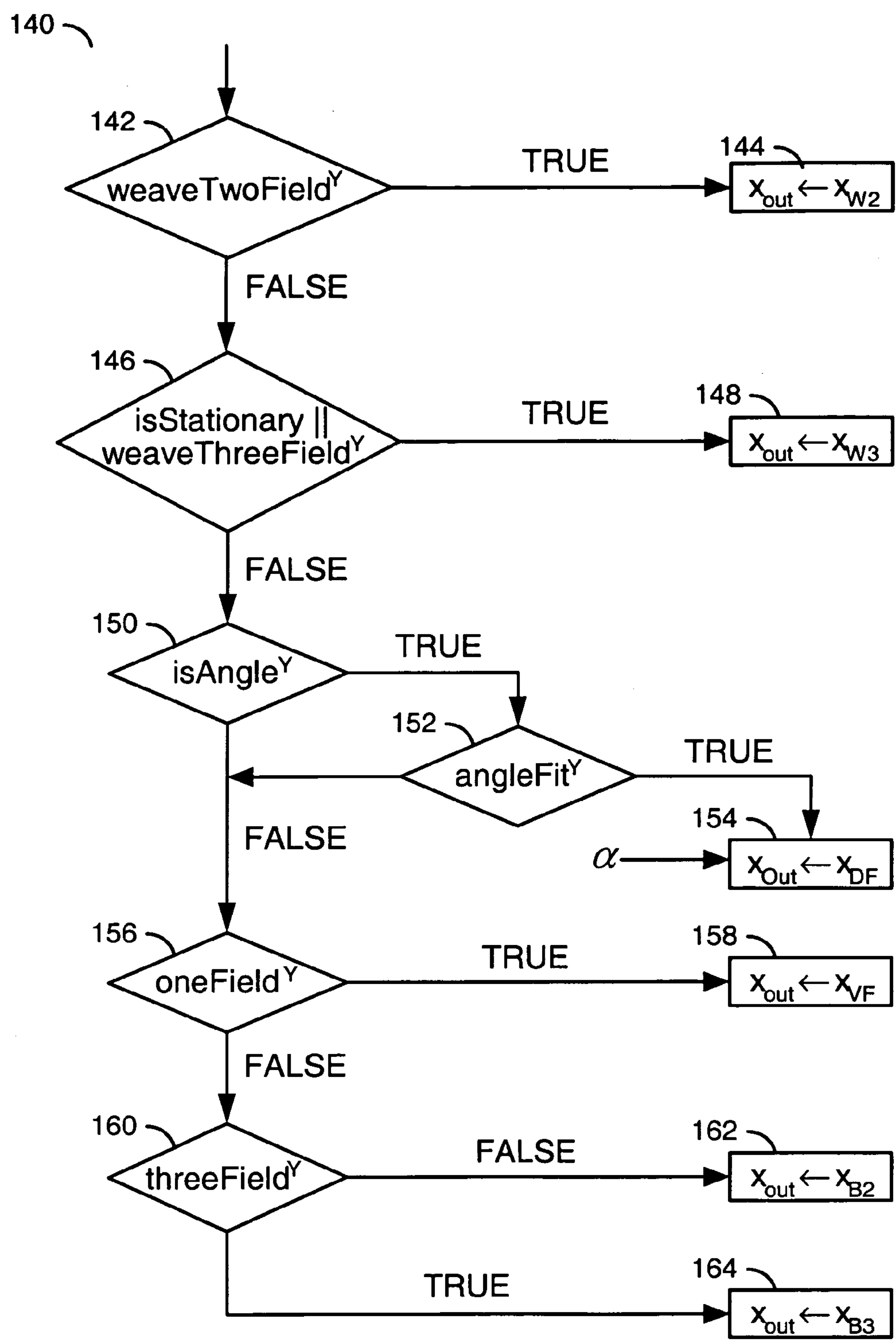
FIG. 7 is a flow diagram of an example luma and chroma deinterlacing method.

Referring to FIG. 7, a flow diagram of an example luma and chroma deinterlacing method 140 is shown. The deinterlacing method (or process) 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160, a step (or block) 162 and a step (or block) 164. The TriMADI architecture generally uses the same deinterlacing method 140 for both luma and chroma deinterlacing. A difference between chroma deinterlacing and luma deinterlacing may be how the control signals and results (e.g., x's) are computed.

For chroma deinterlacing, all control signals may be replaced by the corresponding chroma version of the signal (e.g., replace the superscript Y with a superscript C or K). For example, the signal weaveTwoField$^Y$ may be replaced by the signal weaveTwoField$^C$, the signal weaveThreeField$^Y$ may be replaced by the signal weaveThreeField$^C$, the signal oneField$^Y$ may be replaced by the signal oneField$^C$, the signal threeField$_Y$ may be replaced by the signal threeField$^C$ and so on. Furthermore, all x's may be replaced by corresponding $x^K$ versions.

In the step 142, the deinterlacing method 140 may check the value of the signal weaveTwoField. If the value is true (e.g., the TRUE branch of the step 142), the method 140 may generate an output sample variable (e.g., $X_{out}$) using a variable (e.g., $x_{W2}$) calculated using the weaveTwoField method in the step 144. If the value is false (e.g., the FALSE branch of step 142), the method 140 may continue with the step 146.

In the step 146, the deinterlacing method 140 may check a Boolean logical OR (e.g., the symbol "‖") of the values in the signal isStationary and the signal weaveThreeField$^Y$. If the logical OR is true (e.g., the TRUE branch of the step 146), the method 140 may generate the output sample variable $X_{out}$ using a variable (e.g., $x_{W3}$) calculated using the weaveThreeField method in the step 148. If the logical OR is false (e.g., the FALSE branch of step 146), the method 140 may continue with the step 150.

In the step 150, the deinterlacing method 140 may check the value in the signal isAngle$^Y$. If the value is true (e.g., the TRUE branch of the step 150), the method 140 may continue with the step 152. If the value is false (e.g., the FALSE branch of step 150), the method 140 may continue with the step 156.

In the step 152, the deinterlacing method 140 may check the value of the signal angleFit. If the value is true (e.g., the TRUE branch of the step 152), the method 140 may generate the output sample variable $X_{out}$ using a variable (e.g., $x_{df}$) in the angle signal a in the step 154. If the value is false (e.g., the FALSE branch of step 152), the method 140 may continue with the step 156.

In the step 156, the deinterlacing method 140 may check the value of the signal oneField. If the value is true (e.g., the TRUE branch of the step 156), the method 140 may generate the output sample variable, $X_{out}$ using a variable (e.g., $x_{vf}$) calculated using a vertical spatial filtering method (e.g., bob method) in the step 158. If the value if the signal is false (e.g., the FALSE branch of step 156), the method 140 may continue with the step 160.

In the step 160, the deinterlacing method 140 may check the value of the signal threeField. If the value is true (e.g., the TRUE branch of the step 160), the method 140 may generate the output sample variable $X_{out}$ using a variable (e.g., $x_{B2}$) calculated using the blend of 2 fields method (e.g., B2 method) in the step 162. If the value if the signal is false (e.g., the FALSE branch of step 160), the method 140 may generate the output sample variable $X_{out}$ using a variable (e.g., $x_{B3}$) calculated using the blend of 3 fields method (e.g., B3 method) in the step 162.

The angle detection may not be performed for the chroma channels in some embodiments. Therefore, (i) no angle information may be available in chroma deinterlacing, (ii) the signal isAngle$^C$ is always false and (iii) the values in both the signal angleFit$^K$ and the signal $x_{DF}^K$ may be ignored. In some embodiments, the whole branch corresponding to the signal isAngle may be omitted in the implementation for chroma.

Luma Deinterlacing Component

If the value in the signal weaveTwoField$^Y$ is true, the weave method may be used to generate the luma output. The variable $x_{W2}$ is generally a co-located pixel in the previous field PREV. Thus for luma deinterlacing, the value of $x_{W2}$ may be defined per equation 2 as shown in FIG. 18*a*. In equation 2, PRE[u][v] may be a collocated luma sample in a previous opposite-parity field. The previous (opposite-parity) field PRE field may be used for weaving. However, for input video having a 3:2 pull-down scheme, weaving may be performed using the next field NXT. In such a case, the previous field PRE may be swapped with the next field NXT before processing by the TriMADI method.

The three-field median weave is generally used where the current pixel is determined to be stationary (e.g., the signal isStationary is true) or when the signal weaveThreeField$^Y$ is true (see FIG. 7). The median weave output variable $x^{W3}$ may be computed per equation set 3, as shown in FIG. 18*a*. In the equation set 3, the variable $X_{vf}$ may be defined in equation 4 and the variable $x_{co}$ may be defined as a median of the variables $x_{cp}$, $X_{cn}$ and $x_{vf}$.

If the pixel to be interpolated is declared not to be an edge pixel (e.g., the signal isAngle=false), a 4-tap vertical filter may be applied to generate the interpolated variable $x_{vf}$ per equation 4, as shown in FIG. 18*b*. The variable $x_{vf}$ should be clipped into a range [0, 255].

If the pixel to be interpolated is declared to be an edge pixel (e.g., the signal isAngle=true), a directional filter may be applied to generate the interpolated variable $x_{df}$ per equation 5, as shown in FIG. 18*b*. The angle variable a may be a detected angle, the variable b and the variable 1 (lower case L) may be obtained from the angle α. The four pixels used in the above directional filter are generally "directionally" centered at the position (u,v). For example, see FIG. 12 for a case of α=2.

The interpolated pixel $X_{out}$ should not cause dramatic changes to the local vertical activity. Thus, the following "protection" conditions may be imposed:

$$\text{local\_set}=\{CUR[u-1][v-1],CUR[u+1][v-1],CUR[u-1][v+1],CUR[u+1][v+1],x_{out}[u][v-1]\}. \quad (1)$$

$$\text{min\_set}=\{\text{local\_set},\max(CUR[u-1][v],CUR[u+1][v])\}. \quad (2)$$

$$\text{max\_set}=\text{local\_set},\min(CUR[u-1][v],CUR[u+1][v])\}. \quad (3)$$

$$\text{min0}=\text{minimum of min\_set}. \quad (4)$$

$$\text{min1}=2^{nd}\text{minimum of min\_set}. \quad (5)$$

$$\text{max0}=\text{maximum of max\_set}. \quad (6)$$

$$\text{max1}=2^{nd}\text{maximum of max\_set}. \quad (7)$$

$$\text{max\_side\_gradient}=\max(|CUR[u-1][v-1]-CUR[u+1][v-1]|,|CUR[u-1][v+1]-CUR[u+1][v+1]|). \quad (8)$$

$$\text{min\_side\_gradient}=\min(|CUR[u-1][v-1]-CUR[u+1][v-1]|,|CUR[u-1][v+1]-CUR[u+1][v+1|). \quad (9)$$

$$\text{gradient}=\max(\min(\text{max0}-\text{min1},\text{max1}-\text{min0},\text{max\_side\_gradient}),\text{min\_side\_gradient}). \quad (10)$$

An angle fitness value (e.g., angleFIT$^Y$) may be calculated per equation 6, as shown in FIG. 18*b*. In equation 6, the parameter $C_3$ is generally a programmable parameter with integer values from 0 to 15 and a default value of 9. If the above condition is satisfied, $x_{df}$ (as defined in equation 5) may be used as the generated final output. Otherwise, the pixel may be treated as a non-edge pixel (see FIG. 7). The "gradient" operation in equation 6 is a measure of local pixel variation that generally rejects outliers. The gradient operation generally fixes many "broken" diagonal lines, particularly lower contrast lines, while not introducing significantly visible new false angle interpolations. Use of default values of zero for local_set pixels outside the picture is acceptable as the "side gradients" generally prevent an unduly large gradient.

A blending of the variable $x_{vf}$ with the variable $x_{co}$ and to generate a final blended variable (e.g., $x_{blend}$) may be calculated per equation 7, as shown in FIG. 18*b*. In equation 7, (i) $x_{cp}$=PRE[U] [v] may be the collocated pixel previous field pixel, (ii)

$$x_{cn} = \begin{cases} PRE[u][v] & threeField^Y = \text{false} \\ NXT[u][v] & threeField^Y = \text{true} \end{cases}$$

may be the co-located next field pixel when threeField$^Y$ is true and is the same as $x_{cp}$ when threeField$^Y$ is false and (iii) $x_{co}$=median($x_{cp}$, $x_{cn}$, $x_{vf}$) is generally used for pixelwise weave with blending. The variable $x_{B2}$ is generally derived from the vertically filtered value (e.g., bob) with the co-located pixels in the previous fields. The variable $x_{B3}$ may be derived from the vertically filtered value (e.g., bob) with the co-located pixels in the previous and next fields.

A blending factor (e.g., μ) may be calculated by equation set 8, as shown in FIG. 18*b*. In the equation set 8, the parameter Δτ may be a programmable parameter in the set {2, 4, 8, 16}. The default value of Δτ may be 16 when the signal ThreeLumaField is true and 8 when the signal ThreeLumaField is false. The value of τ may be calculated by equation set 9, as shown in FIG. 18*c*. In equation set 9, the parameters $\tau_{scale}$ and $n_{scale}$ are generally programmable parameters in the set {1, . . . , 16}. A default value for $n_{scale}$ may be 8. A default value for $\tau_{scale}$ may be 8 when the signal ThreeLumaField is true and 4 when the signal ThreeLumaField is false. For a 3-field blending, the default value may yield no scaling for $\tau_3$ and $x_n$. For a 2-field blending, $x_n$ may always be 0 since the next field NXT is treated as the previous field PRE. As such, $n_{scale}$ generally has no effect for 2-field blending.

Figure 8:
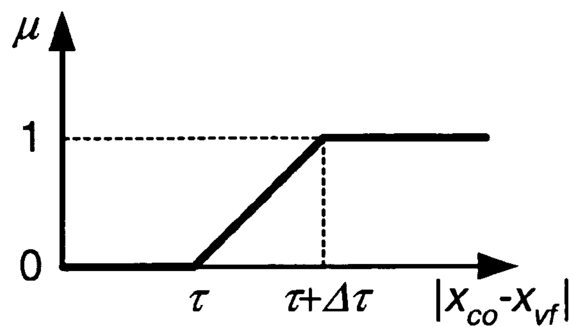
FIG. 8 is a graph of a blending factor as a function of two variables.

Referring to FIG. 8, a graph of the blending factor μ as a function of the variables Xco and Xvf is shown. The blending factor μ may be used for spatial-temporal nonlinear blending of multiple fields. A variable τ1 (see Eq. Set 9) used in the blending method may be similar to motion adaptive deinterlacing and motion compensated deinterlacing. Use of a variable τ2 generally avoids artifacts in the vicinity of moving edges (not on the edges). In such situations, if maximum is used, the variable τ1 may become quite large and thus the temporal filtering is generally used instead of the vertical filter. No new noticeable artifacts may be introduced by incorporating the variable τ2. The function of FIG. 8 may be represented in the following pseudo code (to specify the rounding for the above exactly):

$$\text{diff}=\max(|x_{vf}-x_{cp}|,|x_{vf}-x_{cn}|)-\tau$$

$$\text{temp}=x_{vf}-x_{co}$$

$$\text{if (diff} \leqq 0) x_{blend}=x_{co}$$

$$\text{else if (diff} \geqq \Delta\tau) x_{blend}=x_{vf}$$

$$\text{else if (temp}<0) x_{blend}=x_{co}+(\text{diff}\times\text{temp}-(\Delta\tau>>1))/\Delta\tau$$

$$\text{else } x_{blend}=x_{co}+(\text{diff}\times\text{temp}+(\Delta\tau>>1))/\Delta\tau$$

where τhd scale may take a value in a set {¼, ½, 1, 2} and Δτ may take a value in a set {4, 8, 16, 32}.

Chroma Deinterlacing Component

If the signal weaveTwoField$^C$ is true, the weave method may be used to generate the chroma output variable. The variable $x_{W2}^K$ is generally the co-located pixel in the previous field PRE. Thus, for chroma deinterlacing, the value of $x_{W2}^K$ may be defined by equation 10, as shown in FIG. 18*c*. In equation 10, PRE$^K$[cu] [cv] may be a co-located luma sample in the previous opposite-parity field. Furthermore, the field PRE$^K$ (previous opposite-parity field) is used for weaving. However, for a video sequence having a 3:2 pull-down scheme, weaving may be performed using the next field NXT. In such a case, the previous field PRE may be swapped with the next field NXT before being processed by the TriMADI method.

Three-field median weave is generally used when the current pixel is determined to be stationary (e.g., the signal isStationary$^K$ is true) or when the signal weaveThreeField$^C$ is true (see FIG. 7). The median weave output (e.g., $x_{W3}^K$) may be computed per equation set 11, as shown in FIG. 18*c*. In the equation set 11, the variables $x_{vf}^K$ and $x_{co}^K$ may be defined by equations 12 and 13, respectively.

If the pixel to be interpolated is declared not to be an edge pixel (e.g., the signal isAngle$^C$=false), a 2-tap vertical filtering may be applied to generate the interpolated value per equation 12, as shown in FIG. 18*c*. In equation 12, the variable $x_{vf}^K$ should be clipped into the range [0, 255]. For chroma vertical filtering, a 2-tap filter may be used instead of the 4-tap filter used for the luma vertical filtering.

Chroma blending may be essentially the same as luma blending. A difference in chroma blending, compared with luma blending, may be how the variable τ is computed. Equation 13 may be used to blend $x_{vf}^K$ with $x_{co}^K$ as shown in FIG. 18*d*. In equation 13, (i) $x_{cp}^K$=PRE$^K$[cu] [cv] may be the collocated pixel previous field pixel, (ii)

$$x_{cn}^K = \begin{cases} PRE_{cn}^K[u][v] & threeField^C = \text{false} \\ NXT_{cn}^K[u][v] & threeField^C = \text{true} \end{cases}$$

may be the collocated pixel in the next field pixel when the signal threeField$^C$ is true and is the collocated pixel in the previous field if the signal threeField$^C$ is false and (iii) $X_{co}^K$=median ($x_{cp}^K$, $x_{cn}^K$, $x_{vf}^K$) may be used for a pixelwise weave with blending.

The variable $x_{B2}^K$ is generally derived from the vertically filtered value (e.g., bob) with the co-located pixels in the previous fields. The variable $x_{B3}^K$ may be derived from the vertically filtered value (e.g., bob) with the co-located pixels in the previous and next fields.

A blending factor variable (e.g., $\mu^K$) may be calculated per equation set 14, as shown in FIG. 18*d*. In equation set 14, a parameter $\Delta\tau^C$ may be a programmable parameter in the set {1, 2, 4, 8}. The default value of $\Delta\tau^C$ may be 8 if the signal ThreeChromaField is true and 4 if the signal TwoChromaField is true. The variable $\tau^K$ may be calculated per equation set 15, as shown in FIG. 18*d*. In equation set 15, the parameter $n_{scale}$ may be the same programmable parameter as defined in luma blending and $\tau_{scale}^C$ may be a programmable parameter in the set {1, . . . , 16}. A default value for $\tau_{scale}^C$ may be 8 when the signal ThreeChromaField is true and 4 when the signal TwoChromaField is true. For a 3-field blending, the default value generally yields no scaling for $\tau_3$ and $x_n$. For a 2-field blending, the variable $x_n$ may be 0 since the next field $NXT^K$ is treated as the previous field $PRE^K$. As such, the value of $n_{scale}$ generally has no effect for the 2-field blending.

Chroma blending generally uses the same blending technique as in luma. In pseudo code, the chroma blending may be given as follows:

$$temp = x_{vf}^K - x_{co}^K$$

$$diff = \max(|x_{vf}^K - x_{cp}^K|, |x_{vf}^K - x_{cn}^K|) - \tau^K$$

$$\text{if } (diff \leqq 0)\ x_{blend}^K = x_{co}^K$$

$$\text{else if } (diff \geqq \Delta\tau^c)\ x_{blend}^K = x_{vf}^K$$

$$\text{else if } (temp<0)\ x_{blend}^K = x_{co}^K + (diff \times temp - (\Delta\tau^C >> 1))/\Delta\tau^C$$

$$\text{else } x_{blend}^K = x_{co}^K + (diff \times temp + (\Delta\tau^C >> 1))/\Delta\tau^C$$

Luma Angle Detection

Figure 9:
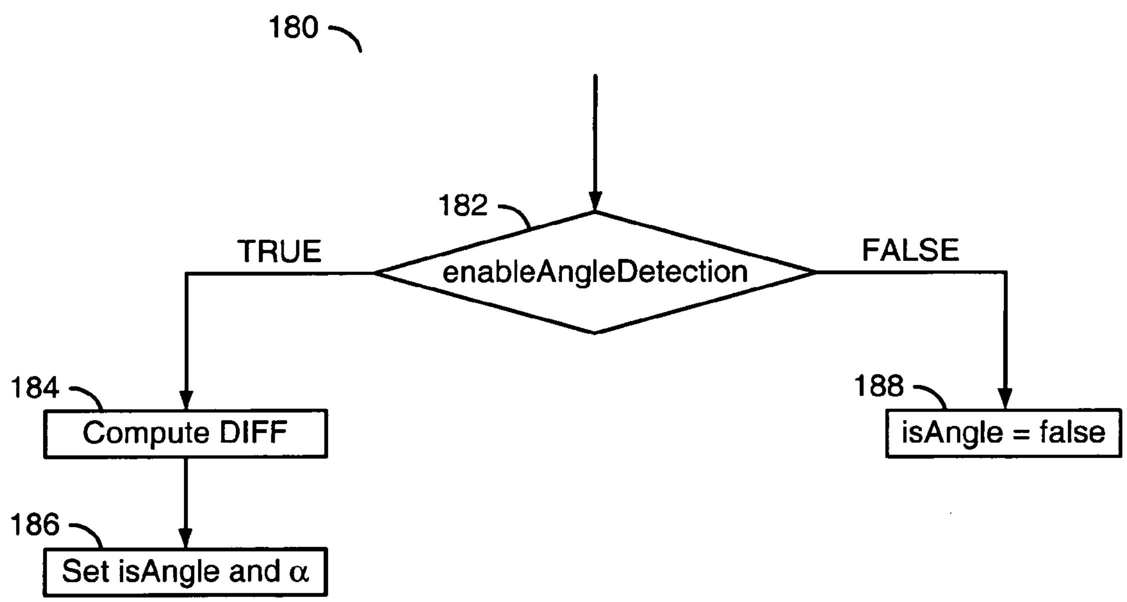
FIG. 9 is a flow diagram of an example luma angle detection method.

Referring to FIG. 9, a flow diagram of an example luma angle detection method 180 is shown. The angle detection method (or process) 180 generally comprises a step (or block) 182, a step (or block) 184, a step (or block) 186 and a step (or block) 188. The luma angle detection method 180 is used to determine (i) whether the current position is an edge and (ii) if yes, the angle of the edge.

In the step 182, the method 180 may check a signal (e.g., enableAngleDetection) to determine if angle detection is enabled or disabled. If the angle detection is enabled (e.g., the TRUE branch of step 182), the method may continue with the step 184. In the step 184, the variables DIFF may be calculated. Afterward, the signal isAngle may be set to true in the step 186. If the angle detection is disabled (e.g., the FALSE branch of step 182), the method 180 may set the signal isAngle to false in the step 188.

Figure 10:
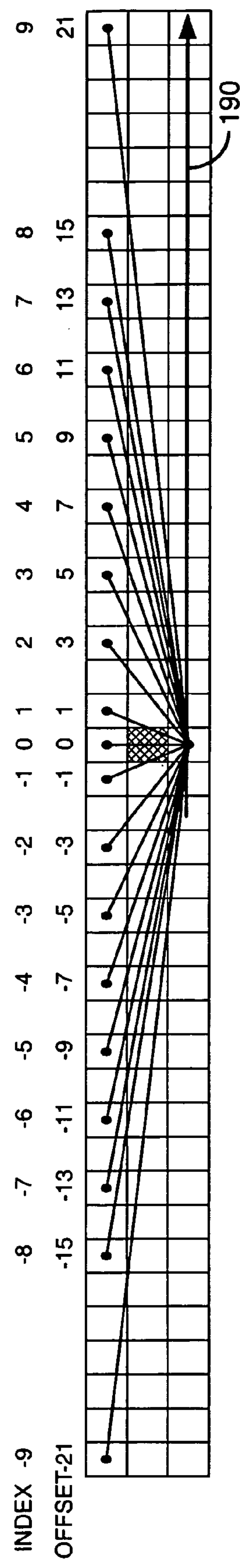
FIG. 10 is a diagram illustrating example detectable angles.

Referring to FIG. 10, a diagram illustrating example detectable angles is shown. The angle detection module 102 may examine a picture to detect an edge in an angled feature near to the position (u,v). In the TriMADI architecture, the picture may be searched along multiple (e.g., 2-19) angles relative to a horizontal axis 190. From left (e.g., index number −9) to right (e.g., index number 9), the angles may be respectively 174.6°, 172.4°, 171.3°, 169.7°, 167.5°, 164.1°, 158.2°, 146.3°, 116.6°, 90.0°, 63.4°, 33.7°, 21.8°, 15.9°, 12.5°, 10.3°, 8.7°, 7.6°, and 5.4°. As shown in FIG. 10, the angle indexes i may have range of $-9 \leqq i \leqq 9$. The indexes correspond to base offset (e.g., b) of −21, −15, −13, −11, −9, −7, −5, −3, −1, 0, 1, 3, 5, 7, 9, 11, 13, 15, and 21. The base offset is generally defined as a pixel distance between the upper lines and the lower lines. Thus, the angle $\alpha$ may be $\tan^{-1}(2/b)$. The mapping between the angle index i, base offset b and the angle $\alpha$ detected is summarized in Table 2, as shown in FIG. 17*b*. Furthermore, the base index b may be a function of the angle index i, and vice versa. The 90.0° angle may be considered as a valid detected angle to increase the accuracy of the angle detection.

To interpolate the pixel at position (u,v) in the current field CUR, an array DIFF[i] may be calculated for each angle index i per equation 16, as shown in FIG. 18*d*. In equation 16, a correlation window may have a size of 2 W. Furthermore, the variable 1 may be defined per equation 17, as shown in FIG. 18*d*.

A correlation window having a size of 24 (e.g., W=12) generally gives good accuracy for calculating the array DIFF. Larger window sizes may improve angle detection accuracy for low angles. Other window sizes may be implemented to meet the criteria of a particular application.

Figure 11:
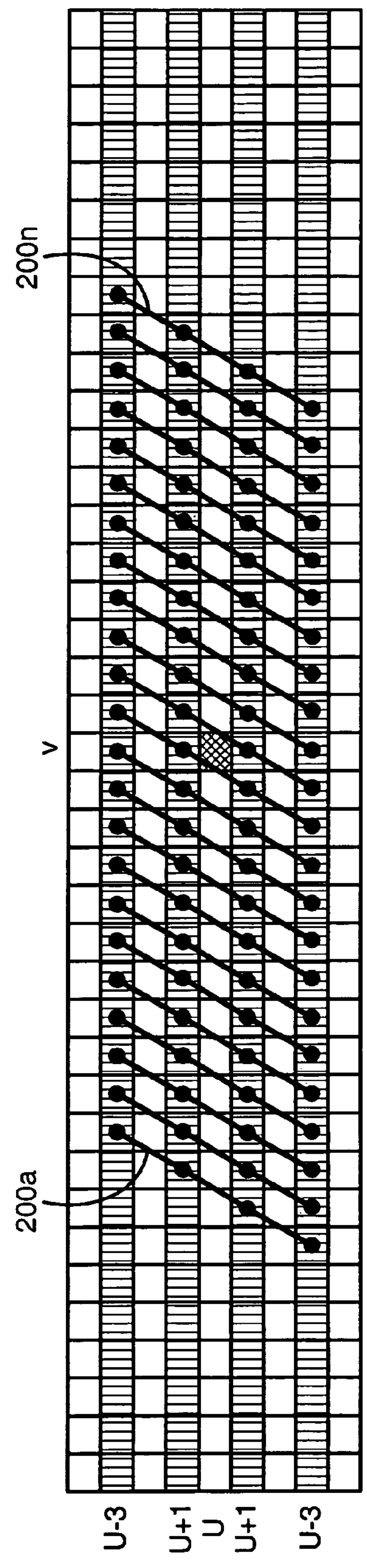
FIG. 11 is a diagram illustrating multiple line segments at a first angle.
Figure 12:
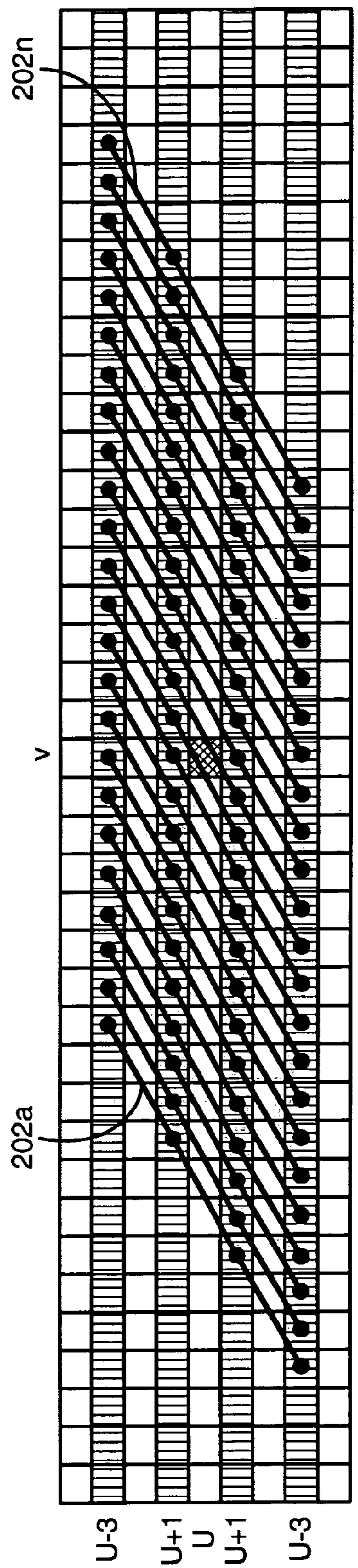
FIG. 12 is a diagram illustrating multiple line segments at a second angle.
Figure 13:
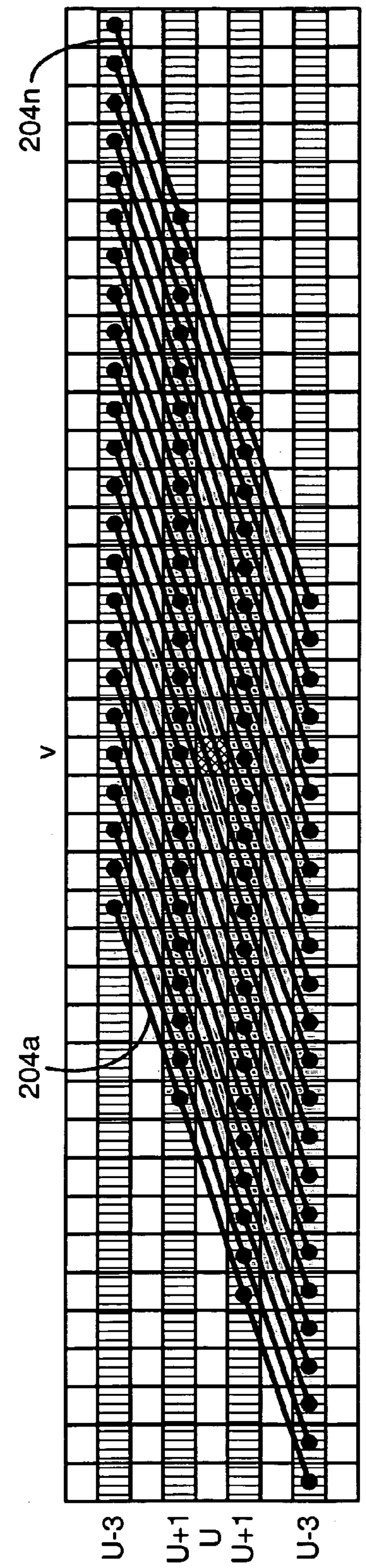
FIG. 13 is a diagram illustrating multiple line segments at a third angle.

Referring to FIGS. 11-13, diagrams for three example angles are shown. FIG. 11 generally illustrates multiple (e.g., N=24) line segments 200*a*-200*n* used to calculate DIFF[i] at a first angle of 63.4°. FIG. 12 generally illustrates the N line segments 202*a*-202*n* at a second angle of 33.7°. FIG. 13 generally illustrates the N line segments 204*a*-204*n* at a third angle of 21.8°. In each example, a unique array DIFF[i] may be calculated as a summation of the (2 W+3×2 W=4×24=96) pair-wise absolute differences along the N=24 line segments, each of which connects multiple black dots in the figures. Other numbers of the line segments, lengths of the line segments and spacing of the line segments may be implemented to meet the criteria of a particular application.

Based on experimental results, a reduced precision of 4 bits per pixel may be sufficient to capture edges with an average step height of at least 16 gray levels in the current field CUR and thus may significantly reduce the hardware cost without significantly affecting perceptual performance. In equation 16, the computation of DIFFs seems to have a high computational complexity (e.g., 19 DIFFs with 96 additions and absolutes each). In practice, an implementation may have fewer computations. Fast computation is generally achievable by exploring the relationship between DIFF[i] at position (u,v) (denoted as $DIFF_{(u,v)}[i]$) and the position (u,v−1) (denoted as $DIFF_{(u,v-1)}[i]$).

Figure 14:
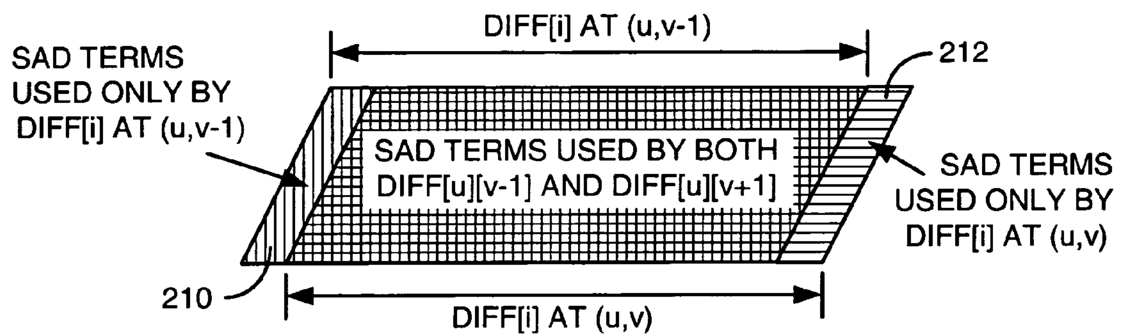
FIG. 14 is a diagram of an example relationship of DIFF[i] at two positions.

Referring to FIG. 14, a diagram of an example relationship of DIFF[i] at position (u,v−1) and the position (u,v) is shown. Although each array DIFF[i] uses 96 additions and absolutes, most sum of absolute difference (SAD) terms in equation 16 are common for position (u,v−1) and (u,v). A difference between DIFF[i] of the two positions is the left border 210 and the right border 212 in the sliding window. Thus, equation 16 may be reformulated as equation set 18, as shown in FIG. 18*e*. If $DIFF_{(u,v-1)}[i]$ is known (in most cases), $DIFF_{(u,v)}[i]$ may be computed with little effort. As shown in equation set 18, the fast technique utilizes 2+3+3=8 additions and absolutes to compute each DIFF[i] for position (u,v). Thus, the computational complexity may be reduced by a factor of 12. For the left-most pixel in a row (e.g., $DIFF_{(u,v=0)}[i]$) a full computation may be performed since $DIFF_{(u,v=-1)}[i]$ does not exist.

After calculating the 19 arrays DIFF, a decision may be made whether or not the current pixel to be interpolated is located on an edge according to the rules below. The following definitions of the terms may be used by the rules:

(1) DIFF_min1=DIFF[$\alpha$] may be a minimum of the 19 DIFFs.

(2) DIFF_min2=DIFF[$\beta$] may be a second minimum.

(3) DIFF_min3 may be a third minimum.

(4) DIFF_max may be the maximum.

If DIFF_min1=DIFF[$\alpha$]==DIFF_min2=DIFF[$\beta$], the value of $\alpha$ should be the index of the center-most angle (e.g., $|\alpha|<|\beta|$). Similarly, if DIFF_min2=DIFF[$\beta$]==DIFF_min3, the value of $\beta$ should be the index of the center-most of DIFF_min2 and DIFF_min3. A distance of index i to the center angle (e.g., 90°) may be defined in Table 3, as shown in FIG. 17*b*. In some embodiments, a hardware implementation may be made simpler by using another rule for breaking "tie" cases. Other rules may be implemented to meet the criteria of a particular application.

(5) A variable (e.g., LEFT) may be defined as an immediate neighboring angle to the left of $\alpha$ and a variable (e.g., RIGHT) may be defined as an immediate neighboring angle to the right of $\alpha$. The variable LEFT and RIGHT may be determined according to equation set 19, as shown in FIG. 18*e*.

(6) Several variables (e.g., UpLeft, UpRight, DownLeft, DownRight) may be a left-most pixel and a right-most pixel in line u−1 and line u+1 of the window. The variables UpLeft, UpRight, DownLeft and DownRight may be determined according to equation set 20, as shown in FIG. 18*e*.

(7) A threshold matrix (e.g., TH_DIFF) may define a maximum allowed SAD for an angle. The matrix TH_DIFF may store angle dependent 8-bit programmable threshold values. If each pixel is represented in 4 bits in calculating DIFFs, the default values for TH_DIFF may be defined in Table 4, as shown in FIG. 17*b*. For 8-bit DIFF calculations, the default values in Table 4 may be multiplied by 16.

A pixel may be declared to be an angle pixel (e.g., isAngle flag=true) if the following conditions are satisfied:

isAngle=

$$\text{DIFF\_min1}*2<c_1*\text{DIFF\_max} \quad (a)$$

$$\&\&\ \text{DIFF\_min1} \leqq TH\text{\_DIFF}[\alpha] \quad (b)$$

$$\&\&\ \text{DIFF\_min1}!=\text{DIFF\_min2} \| \text{DIFF\_min2}!=\text{DIFF\_min3} \quad (c)$$

$$\&\&\ \max(|\text{UpLeft}-\text{DownLeft}|,|\text{UpRight}-\text{DownRight}|)<c_2 \quad (d)$$

$$\&\&((|\alpha-\beta|==1) \quad (e1)$$

$$\|(\text{DIFF\_min1}*2<\text{DIFF\_min2} \quad (e2)$$

$$\&\&\ \text{DIFF[LEFT]}<((3*\text{DIFF\_min2})>>1)$$

$$\&\&\ \text{DIFF[RIGHT]}<((3*\text{DIFF\_min2})>>1)$$

The parameter $c_1$ in condition (a) may be a programmable parameter from {3, 5, . . . , 15, 18} with a default value of 7. The parameter $c_2$ in condition (d) may be a programmable threshold. If only the leading 4 bits of the pixels UpLeft, UpRight, DownLeft and DownRight are used, the threshold may be implemented as a 4-bit integer with a default value of 4. If all 8 bits of the pixels are used, the threshold may be implemented as an 8-bit integer with a default value of 64.

The condition (a) generally avoids background flicker by establishing the angle direction to be much better than at least one other direction. The condition (b) may establish a minimum angle strength. The condition (c) generally avoids concluding with a wrong angle when three angles are equally good. The condition (c) may be useful for a case of reduced bit depth and/or low contrast area. The conditions (d) may add additional criteria to reduce artifacts. The conditions (e1) and (e2) may be logically "OR"ed. The condition (e1) generally states that the best two angles may be neighbors. The condition (e2) may establish additional conditions on DIFFs if the best two angles are not neighbors when condition (e1) is not satisfied. Furthermore, if the signal isAngle is true, the angle α may be defined as the angle of the current pixel for the directional filter.

Since the angle detection process utilizes lines of u−3, u−1, u+1 and u+3, the angle detection process may access lines outside the field boundary for the top line and the bottom line. Furthermore, since the angle detection process may use a large window size (e.g., v±43), the process may access unavailable pixels near the left field boundary and the right field boundary.

As indicated above, all unavailable luma pixels to the left and right of the field boundaries may be assumed to have a value of 0. As such, pad pixels (e.g., calculated pixels outside the picture boundaries) to the left and to the right of the field boundaries may not raise an issue. However, for lines above the top and below the bottom of the field boundaries, several possible approaches may be used: (1) disable angle detection and substitute real pixel value for the pad pixels, (2) disable angle detection and assume the pad pixels to be black (e.g., have a value of 0), (3) enable the angle detection and substitute the top/bottom lines for the out-of-bounds lines and (iv) enable the angle detection and assume a default value (e.g., 0) for all out of bounds pixels. A performance of the above approaches is generally provided in Table 5, as shown in FIG. 17*b*. A list of the various parameters may be found in Table 6, as shown in FIG. 17*c*.

Pixelwise Stationary Check Technique

The TriMADI architecture generally uses a pixelwise stationary check to give sharp output over areas that have little or no change over time (e.g., stationary). As shown in FIG. 6, the stationary check may be performed independently for each channel (e.g., Y, Cb, Cr). For each channel, the stationary check may generate two output Boolean signals (or flags) (i) isStationary and (ii) stat. The signal isStationary is generally used by the deinterlacing technique to produce the output of the current field CUR. The signal stat may be used to update the two-bit stationary counter HSCnt. The counter HSCnt may be used to keep track the number of stationary fields processed in the past. The counter HSCnt may be updated based on the stationary flags of all 3 channels.

Figure 15:
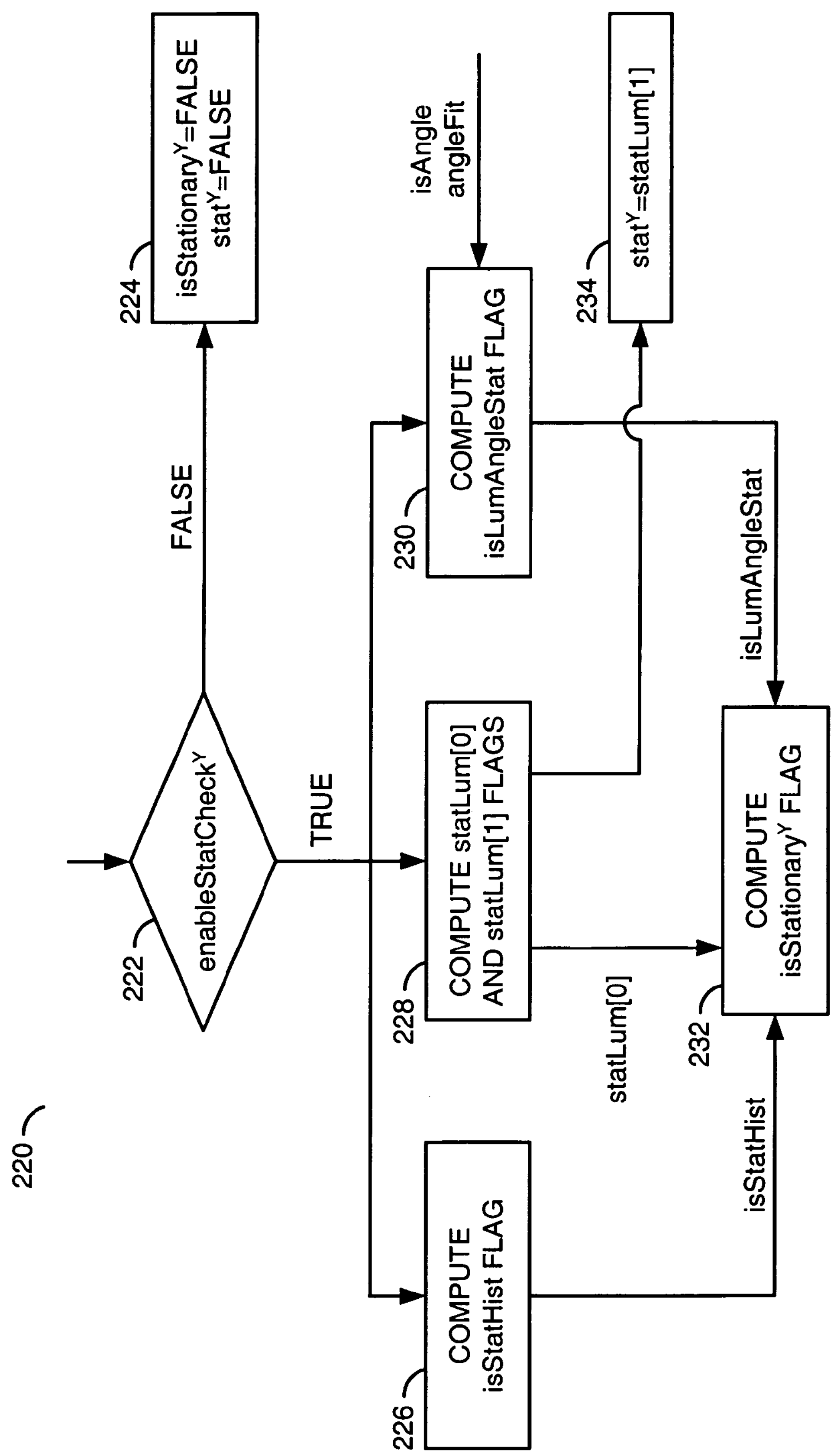
FIG. 15 is a flow diagram of an example pixelwise luma stationary check method.

Referring to FIG. 15, a flow diagram of an example pixelwise luma stationary check method 220 is shown. The luma stationary check method (or process) 220 generally comprises a step (or block) 222, a step (or block) 224, a step (or block) 226, a step (or block) 228, a step (or block) 230, a step (or block) 232 and a step (or block) 234.

In the step 222, the signal $\text{enableStatCheck}^Y$ may be examined. If the signal $\text{enableStatCheck}^Y$ is false (e.g., the FALSE branch of step 222), the stationary check method 220 may set the signal $\text{isStationary}^Y$ to false and set the signal $\text{stat}^Y$ to false in the step 224. If the signal $\text{enableStatCheck}^Y$ is true (e.g., the TRUE branch of step 222), several flags (or signals) may be generated in the steps 226, 228 and 230.

In the step 226, a flag (e.g., isStatHist) may be computed. In the step 228, a first flag (e.g., statLum[0]) and a second flag (e.g., statLum[1]) may be generated. In the step 230, a flag (e.g., isLumAngleStat) may be calculated based on the signal isAngle and the signal angleFit. In the step 232, the signal $\text{isStationary}^Y$ may be computed based on the flag isStatHist, the flag statLum[0] and the flag isLumAngleStat. In the step 234, the flag $\text{stat}^Y$ may be set to the flag statLum[1].

As shown in FIG. 15, several flags may be generated and used inside the luma stationary check method 220. The flag statLum[0] and the flag statLum[1] generally tell if the surrounding pixels in the current field CUR and the opposite-parity fields PRE and NXT are stationary. The flag statLum [0] may be computed with a stricter condition and is used to deinterlace the current field CUR. The flag statLum[1] may be computed with a looser condition and is used to update the stationary counter HSCnt. Furthermore, the value calculated for the flag statLum[1] may be output in the flag $\text{stat}^Y$ of the stationary check technique.

The flag isLumAngleStat may be an additional constraint that makes the luma stationary check more robust when the current pixel was determined to be an edge pixel. The flag isStatHist generally tells if the current position has been sufficiently stationary in the past. The flag isStatHist may be computed based on the counter HSCnt. The flag isStatHist may be used by both the luma stationary check method 220 and a chroma stationary check method. The flag $\text{isStationary}^Y$ is generally used by the luma deinterlacing technique to tell if the current pixel is stationary.

The luma stationary flags may be computed based on the local activities of the current pixel, the activities of one or more horizontally surrounding pixels and on changes between the previous field PRE and the next field NXT. The local activities of positions v−4 to v+4 of a current line may be used in the computation. Details for the computations are generally specified by equation 21, equation set 22, equation set 23, equation 24, equation set 25 and equation 26, as shown in FIGS. 18*f* and 18*g*. The parameters ActOffset, ActScale, and MaxResidue may be programmable parameters defined as follows:

(1) ActScale={2, 3, 4, 5, 6, 7, 8, 9} with default value of 6.
(2) ActOffset={0, 1, 2, . . . , 14, 15} with default value of 7.
(3) MaxResidue={12, 13, . . . , 19} with default value of 15.

In some embodiments, full computation of all intermediate variables in the equations 21 through 26 may be avoided. From equation set 22, the parameter hstatcnt and residue may be computed based on the parameter tdiffact within a sliding window of a predetermined size (e.g., 9). Since most of the intermediate variables may be shared between the position (u,v−1) and the position (u,v), the parameter tdiffact and the parameter lumAct in a sliding window may be temporarily buffered and thus just the variables corresponding to the right most position in the window may be computed individually.

To improve the accuracy of the luma stationary check, the flag isLumAngleStat may be computed based on the angular information of the current luma pixels. The flag isLumAngleStat may be calculated per equation 27, as shown in FIG. 18*g*. In equation 27, the variable MinHistAngle may be a programmable parameter with range of [0, 1, 2, 3] and may have a default value of 2. A larger MinHistAngle value generally gives a tighter condition. The tighter condition may result in a lesser chance of false detections (e.g., wrong true) but a higher chance of miss detection (wrong false). Similarly, a smaller MinHistAngle value generally gives a looser condition and thus a higher chance false detections with a lesser chance of missed detections.

The flag isStatHist may be used to suggest whether the current pixel position (and the vertically surrounding pixels) has been stationary in the past. The flag isStatHist may be used by both the luma stationary check technique and the chroma stationary check technique. The flag isStatHist may be generated per equation 28, as shown in FIG. 18*g*. In equation 28, the parameter MinHistCenter, the parameter MinHistAdjacent and the parameter MinHistSum may be programmable parameters affecting the performance of the stationary check technique. The range of the parameters may be [0, 1, 2, 3], [3, 4, 5, 6], and [0, 1, . . . , 14, 15], respectively. The default values may be 2, 6, and 9 respectively. Larger values of the parameters generally yield tighter conditions. The tighter conditions may result in a lesser chance of false detection (wrong true) but a higher chance of miss detection (wrong false). Similarly, smaller values generally give a looser condition and thus may produce a higher chance false detections with a lesser chance of missed detections.

The flag isStationary$^Y$ may be used by the luma deinterlacing technique (see FIGS. 6 and 7). The flag isStationary$^Y$ may be generated as a logical AND of the flag statLum[0], the flag isLumAngleStat and the flag isStatHist, as shown in equation 29 in FIG. 18*g*.

Figure 16:
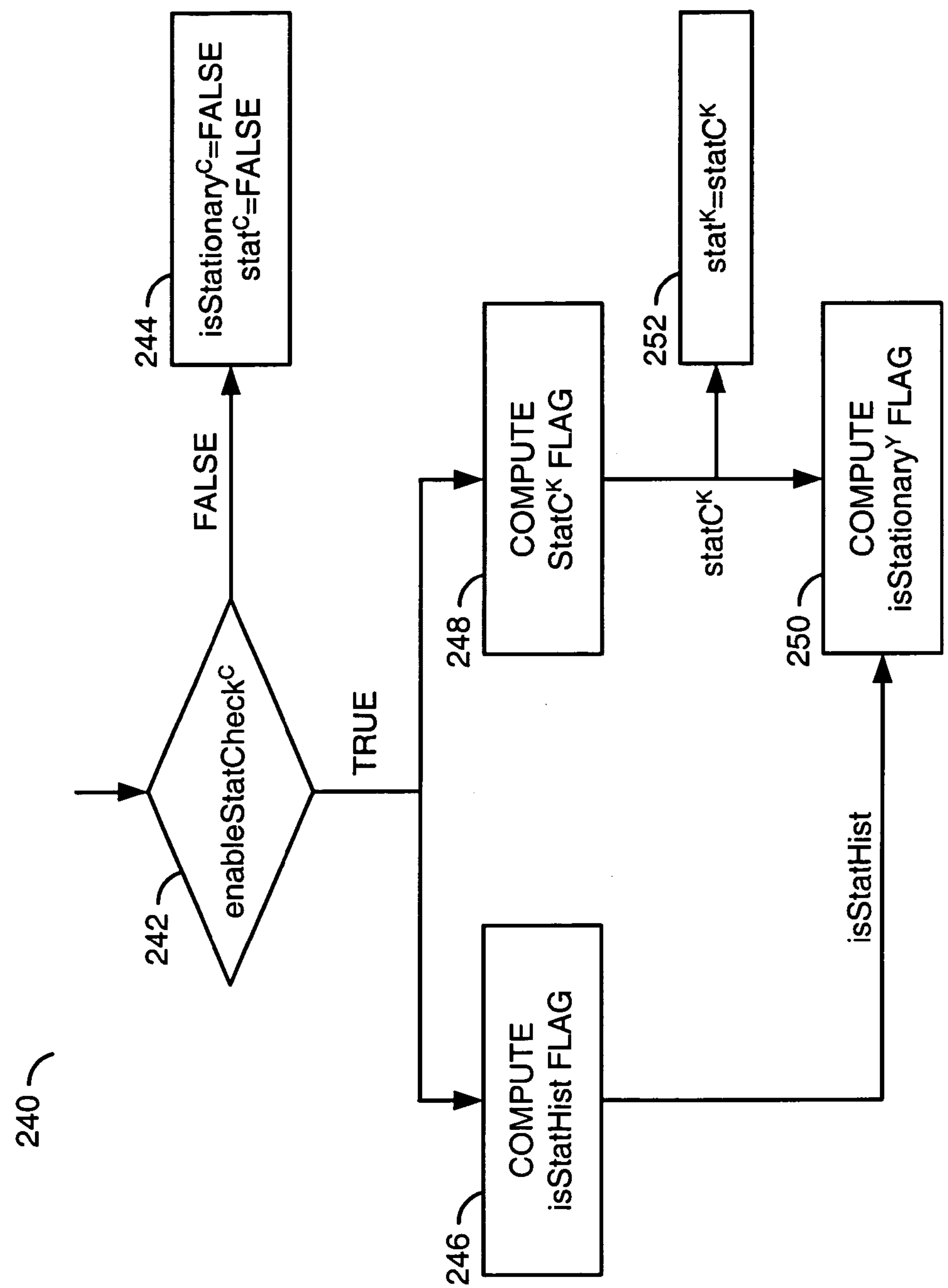
FIG. 16 is a flow diagram of an example pixelwise chroma stationary check method.

Referring to FIG. 16, a flow diagram of an example pixel-wise chroma stationary check method 240 is shown. The chroma stationary check method (or process) 240 generally comprises a step (or block) 242, a step (or block) 244, a step (or block) 246, a step (or block) 248, a step (or block) 250 and a step (or block) 252.

In the step 242, the signal enableStatCheck$^C$ may be examined. If the signal enableStatCheck$^C$ is false (e.g., the FALSE branch of step 242), the stationary check method 240 may set the signal isStationary$^C$ to false and set the signal stat$^C$ to false in the step 244. If the signal enableStatCheck$^C$ is true (e.g., the TRUE branch of step 242), multiple flags (or signals) may be generated in the steps 246 and 248.

In the step 246, the flag isStatHist may be computed. In the step 248, a flag (e.g., statC$^K$) may be generated. In the step 250, the signal isStationary$^Y$ may be computed based on the flag isStatHist and the flag statC$^K$. In the step 252, the flag stat$^K$ may be set to the flag statC$^K$. Unlike in luma stationary checking, which generally produces both a tighter version and a looser version of the stationary flags, only a single flag (e.g., statC$^K$) may be generated for each of the two chroma channels. The flag statC$^K$ generally tells if the pixel in the current field (e.g., CUR$^K$) and opposite-parity fields (e.g., PRE$^K$ and NXT$^K$) is stationary. Furthermore, the flag statC$^K$ may be used to compute the flag isStationary$^K$.

The same stationary check technique may be used for both chroma channels. As shown in FIG. 6, the chroma stationary check method 240 for the Cb channel and the Cr channel may be performed independently. The chroma stationary check method 240 generally uses the same flag isStatHist as in the luma stationary check method 220.

The flag statC$^K$ may be computed based on local activities of the current pixel and of one or more horizontally surrounding pixels. The flag statC$^K$ may be based on changes between the previous field PRE and the next field NXT. Due to potential horizontal downsampling in the chroma channel (in both the 4:2:0 format and the 4:2:2 format), the local activities of positions v−2 to v+2 (instead of ±4 in luma) of the current line may be used in the computations.

The statC$^K$ flag is generated per equation 30 through equation 35, as shown in FIGS. 18*h* and 18*i*. In equations 30 through equation 35, the parameter ActOffset$^C$, the parameter ActScale$^C$ and the parameter MaxResidue$^C$ may be programmable parameters according to the following:

(1) ActScale$^C$={9, . . . , 16} with default value of 13
(2) ActOffset$^C$={0, 1, 2, . . . , 15} with default value of 7
(3) MaxResidue$^C$={12, 13, . . . , 19} with default value of 15

A chroma pixel is considered to be stationary if the current pixel is stationary and is historically stationary in the current position. As such, the flag isStationary$^K$ flag may be generated per equation 36, as shown in FIG. 18*j*.

The stationary check counter HSCnt may be updated when the stationary check is enabled, (e.g., when statCheck or enableStatCheck$^Y$ is true). Since updating the counter HSCnt may consume additional write bandwidth, the counter HSCnt may not be updated when the stationary check is disabled.

When the stationary check is enabled and after the stationary check is performed on all three channels (e.g., after stat$^Y$, stat$^{Cb}$, and stat$^{Cr}$ are all set), the counter HSCnt for the current output position may be updated per equation 37, as shown in FIG. 18*j*. The counter HSCnt is generally incremented by 1 (up to 3) when the current position is found to be stationary in all three channels. The counter HSCnt may be divided by 2 if weakly stationary (e.g., luma is stationary but at least one of the chromas is not stationary). The counter HSCnt may be reset to 0 when the current field CUR is determined not to be stationary. Due to potential chroma downsampling, not all luma samples may have a corresponding chroma sample. Thus, not all flags stat$^Y$ may have a corresponding flag stat$^{cb}$ and a corresponding flag stat$^{Cr}$.

The lack of the chroma flags may be handled as follows. For horizontal chroma downsampling (e.g., for the 4:2:2 format and the 4:2:0 format), the flag stat$^K$ does not exist for all odd v's (see FIGS. 1 and 2). In such a case, the chroma decision made in the position v>>1 may be used (e.g., a decision of the chroma sample corresponding to luma sample at v−1 of the same line).

For vertical chroma downsampling (e.g., for the 4:2:0 format), the flag $stat^K$ does not exist for every other luma line (see FIG. 2). In such a case, the chroma decisions used in the most recently deinterlaced luma line (e.g., u−2) may be used. Therefore, two 1-bit linestores (e.g., a $stat^{cb}$ linestore and a $stat^{Cr}$ linestore) of a size of a chroma width may be used to store the decisions of the entire chroma line. As such, an extra one-bit linestore of the width of luma (chroma is horizontally downsampled by 2 in 4:2:0 format and 2 chroma channels exist) may be implemented. For the top luma line in the bottom fields, no previous chroma decisions exist. In such cases, the flag $stat^{cb}$ and the flag $stat^{Cr}$ may be assumed to be true (e.g., ignore the chroma decisions used in equation 37). The information stored in the one-bit linestore does not need to be written to the memory. As such, the one-bit linestore may not increase a read bandwidth nor a write bandwidth.

The counter HSCnt may be read when computing the flag isStatHist and updating the count HSCnt. Overall, only vertically adjacent counters HSCnt may be used (e.g., only counters HSCnt[x] [v] may be used where $x \in \{u-2, u-1, u, u+1, u+2\}$). No horizontally adjacent HSCnt's are generally used. Thus, no dependency of counters HSCnt generally exists within the same line. However, a dependency may exist between vertically adjacent counters HSCnt.

As a result of the above, if the luma deinterlacing and the chroma deinterlacing cannot be perfectly synchronized in an implementation, updating of the counter HSCnt[u] [v] may be delayed as long as the update occurs before deinterlacing the same vertical position in the next line. For example, the counter HSCnt[u] [v] may be updated before deinterlacing the position (u+2,v) where HSCnt[(u+2)-2] [v] is used. If the counter HSCnt update is delayed, the $stat^{Y/Cb/Cr}$ bits should be tracked for each delayed position. The resulting flexibility generally enables luma processing and chroma processing to be loosely synchronized (with an exact delay unknown) as long as the delay less than a line.

In some embodiments, a previous motion-compensated opposite-parity field (e.g., $PRE_{MC}$) and a next motion-compensated opposite-parity fields (e.g., $NXT_{MC}$) may be used in place of the previous field PRE and the next field NXT, respectively. Therefore, the blending equation for $x_{co}$ may be derived from the co-located pixels (e.g., $PRE^{MC}$[u] [v] and $NXT_{MC}$[u] [v]) in the previous motion-compensated opposite-parity field $PRE_{MC}$ and the next motion-compensated opposite-parity field $NXT_{MC}$. Similarly, stationary check counters may be the motion-compensated as well.

In other embodiments, instead of having just a single stationary counter HSCnt for both luma and chroma, separate stationary history counters may be implemented for each color channel (e.g., three counters HSCnt). As such, more freedom may be offered with separate counters, such as deciding the stationary flag isStationary jointly for all channels or independently for each channel.

In some embodiments, a larger window may be used by the angle detection technique to better detect low angles. Generally, the window sizes for all angles may be the same (e.g., 24 pixels wide). Although a larger window increases accuracy in detecting low angles, the larger window may reduce a misdetection possibility for higher angles. Therefore, variable window sizes may be implemented for different angles. A larger window size may be used for low angles and a smaller window size may be used for high angles. Due to different number of samples used in the computations, the DIFF of different angles may be weighted differently when deciding the final angle candidate.

In still other embodiments, a chroma angle detection may be implemented to allow independent luma/chroma deinterlacing. The chroma angle detection may be based on a prediction method or a detection method. The prediction method generally predicts the chroma angle based on luma angles, therefore saving on computations. However, the prediction method may perform marginally where the luma and chroma are uncorrelated.

The detection method generally detects the chroma angles as in the luma angle detection. The detection method may give a more accurate angle than the prediction method. The detection method generally allows independent luma/chroma deinterlacing. Due to the chroma downsampling, instead of detecting all 19 angles as in luma, a smaller number of angle candidates may be established in the chroma angle detection.

Where the chroma angle detection implemented, the same fitness check method as in luma may be employed. The directionally filtered result (e.g., $x_{df}^K$) (see FIG. 7) may be calculated per equation 38, as shown in FIG. 18*g*. In equation 38, $$kU = \begin{cases} 0 & \alpha^K = 0 \\ (l+1)/2 & \alpha^K > 0, \\ l/2 & \alpha^k < 0 \end{cases}$$

$$kD = \begin{cases} 0 & \alpha^K = 0 \\ (l-b)/2 & \alpha^K > 0, \\ (l-b+1)/2 & \alpha^k < 0 \end{cases}$$

where $\alpha^K$ may be the chroma angle and 1 may the column offset of the upper line and is defined by equation 17.

The function performed by the diagrams, equations and tables of FIGS. 6-9 and 15-18*j* may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method of motion adaptive video deinterlacing, comprising the steps of:

(A) generating a frame by deinterlacing a current field in a first of a plurality of modes;

(B) generating said frame by deinterlacing using both of said current field and an opposite-parity field in a second of said modes, (C) generating said frame by deinterlacing using all of said current field, said opposite-parity field and another field in a third of said modes;

(D) determining a stationary condition on a per-pixel bases between said opposite-parity field and said another field; and (E) selecting said third mode if said stationary condition is true.

2. The method according to claim 1, further comprising the step of:

switching between using different combinations of said modes such that at least one constraint of (i) a memory constraint and (ii) a system bandwidth constraint characterizes one of (a) a system or (b) a particular operational mode of said system.

3. The method according to claim 1, further comprising the step of:

buffering (i) in a memory external to a module configured to generate said frame and (ii) to generate said frame (a) no greater than one field worth of data in said first mode, (b) no greater than two fields worth of data in said second mode and (c) no greater than three fields worth of data in said third mode.

4. The method according to claim 1, further comprising the step of:

transferring (i) from a memory to a module configured to generate said frame and (ii) to generate said frame (a) no fields other than said current field in said first mode, (b) no fields other than said current field and said opposite-parity field in said second mode and (c) no fields other than said current field, said opposite-parity field and said another field in said third mode.

5. The method according to claim 1, further comprising the step of:

generating said frame by deinterlacing using both (i) a variable number of one or more luminance fields and (ii) said variable number of one or more chrominance fields in a fourth of said modes.

6. The method according to claim 5, further comprising the step of:

switching between said first mode, said second mode, said third mode and said fourth mode.

7. The method according to claim 1, further comprising the step of:

changing a number of luminance fields used in deinterlacing in response to a system reconfiguration.

8. The method according to claim 1, further comprising the step of:

changing a number of chrominance fields used in deinterlacing in response to a system reconfiguration.

9. The method according to claim 1, wherein both said opposite-parity field and said another field occur in time before said current field.

10. A system comprising:

a memory configured to buffer a current field; and a module configured to (i) generate a frame by deinterlacing said current field in a first of a plurality of modes, (ii) generate said frame by deinterlacing using both of said current field and an opposite parity field in a second of said modes, (iii) generate said frame by deinterlacing using all of said current field, said opposite parity field and another field in a third of said modes, (iv) determine a stationary condition on a per-pixel bases between said opposite-parity field and said another field and (v) select said third mode if said stationary condition is true.

11. A method of motion adaptive video deinterlacing, comprising the steps of:

(A) generating a plurality of current field counts for a plurality of current pixel locations in a current field, wherein each of said current field counts tracks a stationary history of a respective one of said current pixel locations; and (B) generating a frame by deinterlacing said current field based on said current field counts.

12. The method according to claim 11, wherein step (B) is further based on a plurality of previous field counts of a plurality of previous pixel locations in a previous field.

13. The method according to claim 11, further comprising the step of:

updating said current field counts based on a plurality of stationary checks, one each in a luminance channel of said current field, a first chrominance channel of said current field and a second chrominance channel of said current field.

14. The method according to claim 11, further comprising the step of:

setting said current field counts to a predetermined value.

15. A method of motion adaptive video deinterlacing, comprising the steps of:

(A) in a first mode, generating a frame by spatial-temporal blending a current field, a previous field and a next field;

(B) in a second mode, generating said frame by spatial-temporal blending said current field and said previous field; and (C) selecting a plurality of co-located field pixels from one of two opposite-parity fields relative to said current field, wherein said co-located field pixels are used in said spatial-temporal blending.

16. The method according to claim 15, further comprising the step of:

in a third mode, generating said frame by spatial-temporal blending said current field and said next field.

17. The method according to claim 15, wherein said spatial-temporal blending comprises a median operation.

18. The method according to claim 15, wherein said spatial-temporal blending comprises a nonlinear operation.

19. The method according to claim 15, further comprising the step of:

limiting a change from a spatial filtering based on a difference between said previous field and said next field.

20. A system comprising:

a controller configured to generate a plurality of configuration signals that enable use of a previous field and a next field separately to deinterlace a plurality of luminance fields and a plurality of chrominance fields of a current field; and a module configured to generate a frame by deinterlacing using any set of said luminance fields and said chrominance fields based on said configuration signals, said set including a current field only configuration.

* * * * *